(12) United States Patent
Ge

(10) Patent No.: US 11,483,315 B2
(45) Date of Patent: Oct. 25, 2022

(54) ALIAS MANAGEMENT METHOD AND DEVICE

(71) Applicant: HUAWEI TECHNOLOGIES CO., LTD., Guangdong (CN)

(72) Inventor: Cuili Ge, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 16/742,306

(22) Filed: Jan. 14, 2020

(65) Prior Publication Data
US 2020/0153838 A1 May 14, 2020

Related U.S. Application Data

(63) Continuation of application No. PCT/CN2018/086754, filed on May 14, 2018.

(30) Foreign Application Priority Data

Jul. 17, 2017 (CN) .......................... 201710583363.6

(51) Int. Cl.
*H04L 61/30* (2022.01)
*H04L 67/306* (2022.01)
(Continued)

(52) U.S. Cl.
CPC ............ *H04L 63/102* (2013.01); *H04L 61/30* (2013.01); *H04L 63/062* (2013.01); *H04L 67/01* (2022.05);
(Continued)

(58) Field of Classification Search
CPC ....... H04W 12/06; H04W 8/265; H04W 8/18; H04W 12/12; H04W 8/20; H04L 63/102;
(Continued)

(56) References Cited

U.S. PATENT DOCUMENTS 7,231,605 B1 *  6/2007  Ramakesavan ......... H04L 61/00
                                                        715/734
10,440,561 B2 * 10/2019  Bush ..................... H04W 60/00
(Continued)

FOREIGN PATENT DOCUMENTS

CN        101039322 A     9/2007
CN        101360091 A     2/2009
(Continued)

OTHER PUBLICATIONS

3GPP TS 22.280 V15.0.0 (Jun. 2017),3rd Generation Partnership Project, Technical Specification Group Services and System Aspects, Mission Critical Services Common Requirements (MCCoRe), Stage 1 (Release 15), 90 pages.
(Continued)

*Primary Examiner* — Tonia L Dollinger
*Assistant Examiner* — Linh T. Nguyen
(74) *Attorney, Agent, or Firm* — Fish & Richardson P.C.

(57) ABSTRACT

Embodiments of this application relate to the communications field, and describe an alias management method and device. One example method includes the following operations: a functional alias management entity receives a management request message sent by a first client, where the management request message includes an identity of a user and information about an alias requested to be managed; and the functional alias management entity sends a management response message to the first client when the user has an alias management right, where the management response message includes the identity of the user, and information about an alias that is successfully managed.

10 Claims, 7 Drawing Sheets

(51) Int. Cl.
*H04L 9/40* (2022.01)
*H04L 67/01* (2022.01)
*G06F 13/42* (2006.01)

(52) U.S. Cl.
CPC ........ *H04L 67/306* (2013.01); *G06F 13/4221* (2013.01)

(58) Field of Classification Search
CPC ............... H04L 65/1073; H04L 67/306; H04L 63/0876; H04L 67/303; H04L 65/1006; H04L 65/1083; H04L 41/28; H04L 41/5087; H04L 61/30; H04L 61/3015; H04L 65/1069; H04L 9/321; H04L 9/3268; H04L 63/12; H04L 65/403; H04L 9/32; H04M 2203/6045; G06Q 20/385
See application file for complete search history.

(56) References Cited

U.S. PATENT DOCUMENTS

| | | | |
|---|---|---|---|
| 2005/0015499 A1* | 1/2005 | Mayer | H04L 29/06 709/228 |
| 2006/0035658 A1* | 2/2006 | Yoon | H04W 76/45 455/518 |
| 2009/0163244 A1* | 6/2009 | Parkkinen | H04M 1/72406 455/558 |
| 2009/0263139 A1* | 10/2009 | Liu | H04L 65/1026 398/135 |
| 2010/0036925 A1 | 2/2010 | Haffner | |
| 2010/0049654 A1 | 2/2010 | Pilo | |
| 2011/0252085 A1* | 10/2011 | Mase | H04L 67/146 709/203 |
| 2011/0258686 A1 | 10/2011 | Raj et al. | |
| 2012/0263168 A1* | 10/2012 | Petrack | H04M 3/56 370/352 |
| 2013/0125227 A1* | 5/2013 | Lu | H04L 51/04 726/7 |
| 2013/0185813 A1 | 7/2013 | Shim et al. | |
| 2014/0101161 A1 | 4/2014 | Khalil | |
| 2014/0257956 A1* | 9/2014 | Durbha | G06Q 30/0225 705/14.23 |
| 2015/0180822 A1* | 6/2015 | Mathias | H04L 12/58 709/206 |
| 2016/0034892 A1* | 2/2016 | Carpenter | G06Q 20/40 705/44 |
| 2016/0150024 A1* | 5/2016 | White | H04L 45/70 709/203 |
| 2016/0330601 A1* | 11/2016 | Srivastava | B64C 39/024 |
| 2017/0180954 A1* | 6/2017 | McHugh | H04W 4/08 |
| 2018/0098178 A1* | 4/2018 | Yerrabommanahalli | H04W 12/45 |
| 2018/0131730 A1* | 5/2018 | Leis | H04L 61/2069 |
| 2018/0145979 A1* | 5/2018 | Lu | H04L 63/0823 |
| 2019/0319944 A1* | 10/2019 | Kumar | G06Q 20/322 |
| 2019/0327615 A1* | 10/2019 | Landais | H04L 65/1016 |
| 2020/0021975 A1* | 1/2020 | Schouler | H04W 12/08 |

FOREIGN PATENT DOCUMENTS

| | | |
|---|---|---|
| CN | 101404684 A | 4/2009 |
| CN | 102111343 A | 6/2011 |
| CN | 103348761 A | 10/2013 |
| CN | 103391539 A | 11/2013 |
| CN | 105191267 A | 12/2015 |
| CN | 105306577 A | 2/2016 |
| CN | 105657196 A | 6/2016 |
| CN | 105933881 A | 9/2016 |
| CN | 107465546 A | 12/2017 |
| KR | 20130023018 A | 3/2013 |

OTHER PUBLICATIONS

Ericsson LM et al.,"MCX Functional Alias",3GPP TSG-SA WG1 Meeting #78, S1-172428, Porto, Portugal, May 8-12, 2017, 32 pages.

3GPP TS 23.280 V15.0.0 (Jun. 2017),3rd Generation Partnership Project Technical Specification Group Services and System Aspects Common functional architecture to support mission critical services, Stage 2(Release 15), 153 pages.

3GPP TR 23.790 V0.3.0 (May 2017),3rd Generation Partnership Project, Technical Specification Group Services and System Aspects, Study on Application Architecture for the Future Railway MobileCommunication System, Stage 2 (Release 15), 14 pages.

Nokia et al.,"Role management and presence related use cases",3GPP TSG-SA WG1 Meeting #75, S1-162068, San Francisco, CA, USA, Aug. 22-26, 2016, 8 pages.

Nokia,"User profile configuration management procedures to support functional alias(es)", 3GPP TSG-SA WG6 Meeting #18, S6-170886, Malm, Sweden, Jul. 17-21, 2017, 6 pages.

Nokia,"Configuration management procedures to support functional alias(es)", 3GPP TSG-SA WG6 Meeting #18, S6-171093, Malm, Sweden, Jul. 17-21, 2017, 6 pages.

PCT International Search Report and Written Opinion in International Application No. PCT/CN2018/086,754, dated Jul. 19, 2018, 19 pages (With English Translation).

Extended European Search Report issued in European Application No. 18836132.3 dated Mar. 9, 2020, 9 pages.

Office Action issued in Chinese Application No. 201710583363.6 dated Jun. 28, 2020, 6 pages (With English Translation).

Office Action issued in Chinese Application No. 201710583363.6 dated Dec. 17, 2019, 21 pages (With English Translation).

Office Action issued in Chinese Application No. 202010568222.9 dated May 24, 2021, 17 pages (with English translation).

Office Action issued in Korean Application No. 200-7004308 dated Nov. 27, 2020, 14 pages (with English translation).

3GPP TS 23.281 V15.0.0 (Jun. 2017), "3rd Generation Partnership Project; Technical Specification Group Services and System Aspects; Functional architecture and information flows to support Mission Critical Video (MCVideo); Stage 2 (Release 15)," Jun. 2017, 163 pages.

3GPP TS 23.379 V15.0.0 (Jun. 2017), "3rd Generation Partnership Project; Technical Specification Group Services and System Aspects; Functional architecture and information flows to support Mission Critical Push To Talk (MCPTT); Stage 2(Release 15)," Jun. 2017, 187 pages.

Nokia et al., "Role management and presence related use cases," 3GPP TSG-SA WG1 Meeting #75, S1-162286, San Francisco, CA, USA, Aug. 22-26, 2016, 9 pages.

* cited by examiner

ALIAS MANAGEMENT METHOD AND DEVICE

CROSS-REFERENCE TO RELATED APPLICATIONS

This application is a continuation of International Application No. PCT/CN2018/086754, filed on May 14, 2018, which claims priority to Chinese Patent Application No. 201710583363.6, filed on Jul. 17, 2017, The disclosures of the aforementioned applications are hereby incorporated by reference in their entireties.

TECHNICAL FIELD

Embodiments of this application relate to the communications field, and in particular, to an alias management method and device.

BACKGROUND

The 3rd Generation Partnership Project (3GPP) has standardized a group of mission critical services based on a 3GPP Long Term Evolution (LTE) system to support trunking communication in a public security scenario. The mission critical services may include basic services such as a mission critical push to talk (MCPTT) service, a mission critical data (MCData) service, and a mission critical video (MCVideo) service. Other services such as a railway application and an enterprise application can also be created based on the basic services.

In an existing mission critical service system based on the 3GPP LTE system, each user has an identity that is used to uniquely identify the user. For different services, a same user may use a same identity, or may use different identities. Each identity of the user may correspond to one or more aliases. As a name of a person, a thing, an object, or a service other than an official legal name or a standard name, an alias may be used in a written language, or may be used in an oral language. The alias may also be referred to as a nickname. In the prior art, an alias may be a name of a user other than an identity. For example, it may be an alias in a phone number format, for example, +86 130 xxxx xxxx, or may be an alias in a uniform resource identifier (URI) format, for example, username@domain, or may be an alias formed by characters or symbols that can be recognized and remembered by a natural person easily. Specifically, an alias may be specified with reference to information such as an identity, an employer, or a location of a user, for example, a chief conductor on train G20, a conductor on G20, or a dispatcher at Beijing South Railway Station.

In the prior art, the alias is preconfigured in a user configuration file during system deployment. When alias management, for example, registration, activation, deactivation, or takeover needs to be performed, the user configuration file in which the alias is configured to be first processed correspondingly. Consequently, alias management efficiency is low, and system processing load is heavy. For example, when the user needs to register a new alias, the user modifies the user configuration file or configure a new user configuration file to complete alias registration.

SUMMARY

Embodiments of this application provide an alias management method and device to resolve a problem of low alias management efficiency and heavy system processing load.

To achieve the foregoing objective, the embodiments of this application use the following technical solutions.

According to a first aspect, an embodiment of this application provides an alias management method, including: receiving, by a functional alias management entity, a registration request message sent by a first client, where the registration request message includes an identity of a user and a name of an alias requested to be registered; and sending, by the functional alias management entity, a registration response message to the first client when the user has an alias registration right, where the registration response message includes the identity of the user, a name of an alias that is successfully registered, and an identity of the alias that is successfully registered.

In the alias management method provided by this embodiment of this application, the functional alias management entity receives the registration request message sent by the first client and including the identity of the user and the name of the alias requested to be registered; and when the user has the alias registration right, the functional alias management entity sends, to the first client, the registration response message including the identity of the user, the name of the alias that is successfully registered, and the identity of the alias that is successfully registered. After the functional alias management entity receives the registration request message sent by the first client, when determining that the requester that requests to register the alias has the alias registration right, the functional alias management entity returns, to the first client, the registration response message including the identity of the requester, the name of the alias that is successfully registered, and the identity of the alias that is successfully registered, without correspondingly processing a user configuration file in which the alias is configured. Therefore, alias registration can be implemented, and a problem of low alias management efficiency and heavy system processing load is resolved.

With reference to the first aspect, in a possible implementation, before the sending, by the functional alias management entity, a registration response message to the first client, the alias management method may further include: obtaining, by the functional alias management entity, subscription information of the user based on the identity of the user, where the subscription information includes indication information, and the indication information is used to indicate that the user has the alias registration right; or obtaining, by the functional alias management entity, policy information, and determining, based on the obtained policy information, that the user has the alias registration right, where the policy information includes an identity of a user that has the alias registration right.

With reference to the first aspect or the foregoing possible implementation, in another possible implementation, the alias management method may further include: when the user does not have the alias registration right, sending, by the functional alias management entity, a failure response message to the first client, where the failure response message may carry a failure cause, and the failure cause is used to indicate that authorization check on the user fails.

With reference to the first aspect or the foregoing possible implementation, in another possible implementation, before the sending, by the functional alias management entity, a registration response message to the first client, the alias management method may further include: when the name of the alias requested to be registered is not registered, allocating, by the functional alias management entity, the identity to the alias requested to be registered, where the alias that is successfully registered is the alias requested to be registered.

With reference to the first aspect or the foregoing possible implementation, in another possible implementation, the alias management method may further include: when the name of the alias requested to be registered is already registered, sending, by the functional alias management entity, a failure response message to the first client, where the failure response message may carry a failure cause, and the failure cause is used to indicate that the alias requested to be registered is already registered.

With reference to the first aspect or the foregoing possible implementation, in another possible implementation, the registration request message may further include at least one of the following: a service type of the alias requested to be registered, an attribute of the alias requested to be registered, an application scope of the alias requested to be registered, and a valid time of the alias requested to be registered.

With reference to the first aspect or the foregoing possible implementation, in another possible implementation, the alias management method may further include: sending, by the functional alias management entity, a notification message to a second client, where the notification message may include the name of the alias that is successfully registered, and the identity of the alias that is successfully registered.

With reference to the first aspect or the foregoing possible implementation, in another possible implementation, when the functional alias management entity is not disposed in a mission critical service server, the alias management method may further include: sending, by the functional alias management entity, a notification message to the mission critical service server, where the notification message may include the name of the alias that is successfully registered, and the identity of the alias that is successfully registered.

With reference to the first aspect or the foregoing possible implementation, in another possible implementation, the notification message may further include at least one of the following: a service type of the alias that is successfully registered, an attribute of the alias that is successfully registered, an application scope of the alias that is successfully registered, and a valid time of the alias that is successfully registered.

According to a second aspect, an embodiment of this application provides an alias management method, including:

receiving, by a functional alias management entity, an activation request message sent by a first client, where the activation request message includes an identity of a user and an identity of an alias requested to be activated; and sending, by the functional alias management entity, an activation response message to the first client when the user has an alias activation right, where the activation response message includes the identity of the user and an identity of an alias that is successfully activated.

In the alias management method provided by this embodiment of this application, the functional alias management entity receives the activation request message sent by the first client and including the identity of the user and the identity of the alias requested to be activated; and when the user has the alias activation right, the functional alias management entity sends, to the first client, the activation response message including the identity of the user and the identity of the alias that is successfully activated. After the functional alias management entity receives the activation request message sent by the first client, when determining that the requester that requests to activate the alias has the alias activation right, the functional alias management entity returns, to the first client, the activation response message including the identity of the requester and the identity of the alias that is successfully activated, without correspondingly processing a user configuration file in which the alias is configured. Therefore, alias activation can be implemented, and a problem of low alias management efficiency and heavy system processing load is resolved.

With reference to the second aspect, in a possible implementation, before the sending, by the functional alias management entity, an activation response message to the first client, the alias management method may further include: obtaining, by the functional alias management entity, subscription information of the user based on the identity of the user, where the subscription information includes indication information, and the indication information is used to indicate that the user has the alias activation right; or obtaining, by the functional alias management entity, policy information, and determining, based on the obtained policy information, that the user has the alias activation right, where the policy information includes an identity of a user that has the alias activation right.

With reference to the second aspect or the foregoing possible implementation, in another possible implementation, the alias management method may further include: when the user does not have the alias activation right, sending, by the functional alias management entity, a failure response message to the first client, where the failure response message may carry a failure cause, and the failure cause is used to indicate that authorization check on the user fails.

With reference to the second aspect or the foregoing possible implementation, in another possible implementation, when the alias requested to be activated is not an alias that a plurality of users are allowed to simultaneously activate, and the alias requested to be activated is not activated, the alias that is successfully activated is the alias requested to be activated; or when the alias requested to be activated is an alias that a plurality of users are allowed to simultaneously activate, and a quantity of users who successfully activate the alias requested to be activated is greater than 0 and less than a maximum activation quantity, the alias that is successfully activated is the alias requested to be activated; or when the alias requested to be activated is not an alias that a plurality of users are allowed to simultaneously activate, the alias requested to be activated is not activated, and a service type of the alias requested to be activated is the same as a service type corresponding to the identity of the user, the alias that is successfully activated is the alias requested to be activated; or when the alias requested to be activated is an alias that a plurality of users are allowed to simultaneously activate, a quantity of users who successfully activate the alias requested to be activated is greater than 0 and less than a maximum activation quantity, and a service type of the alias requested to be activated is the same as a service type corresponding to the identity of the user, the alias that is successfully activated is the alias requested to be activated. The activation request message may further include the service type of the alias requested to be activated.

With reference to the second aspect or the foregoing possible implementation, in another possible implementation, the alias management method may further include: when the alias requested to be activated is not an alias that a plurality of users are allowed to simultaneously activate, but the alias requested to be activated is already activated, sending, by the functional alias management entity, a failure response message to the first client, where the failure response message may carry a failure cause, and the failure cause is used to indicate that the alias requested to be activated is already activated; or when the alias requested to be activated is an alias that a plurality of users are allowed to simultaneously activate, but a quantity of users who successfully activate the alias requested to be activated is greater than a maximum activation quantity, sending, by the functional alias management entity, a failure response message to the first client, where the failure response message may carry a failure cause, and the failure cause is used to indicate that the quantity of users who successfully activate the alias requested to be activated already reaches the maximum activation quantity.

With reference to the second aspect or the foregoing possible implementation, in another possible implementation, the alias management method may further include: storing, by the functional alias management entity, an association relationship between the identity of the user and the alias that is successfully activated.

With reference to the second aspect or the foregoing possible implementation, in another possible implementation, the alias management method may further include: sending, by the functional alias management entity, a notification message to a second client, where the notification message is used to notify the second client that the user successfully activates the alias that is successfully activated.

With reference to the second aspect or the foregoing possible implementation, in another possible implementation, the activation response message may further include a service type of the alias that is successfully activated.

With reference to the second aspect or the foregoing possible implementation, in another possible implementation, when the functional alias management entity is not disposed in a mission critical service server, the alias management method may further include: sending, by the functional alias management entity, an activation notification message to the mission critical service server, where the activation notification message includes the identity of the user and the identity of the alias that is successfully activated.

According to a third aspect, an embodiment of this application provides an alias management method, including:

receiving, by a functional alias management entity, a deactivation request message sent by a first client, where the deactivation request message includes an identity of a user and an identity of an alias requested to be deactivated; and sending, by the functional alias management entity, a deactivation response message to the first client when the user has an alias deactivation right, where the deactivation response message includes the identity of the user and an identity of an alias that is successfully deactivated.

In the alias management method provided by this embodiment of this application, the functional alias management entity receives the deactivation request message sent by the first client and including the identity of the user and the identity of the alias requested to be deactivated; and when the user has the alias deactivation right, the functional alias management entity sends, to the first client, the deactivation response message including the identity of the user and the identity of the alias that is successfully deactivated. After the functional alias management entity receives the deactivation request message sent by the first client, when determining that the requester that requests to deactivate the alias has the alias deactivation right, the functional alias management entity returns, to the first client, the deactivation response message including the identity of the requester and the identity of the alias that is successfully deactivated, without correspondingly processing a user configuration file in which the alias is configured. Therefore, alias deactivation can be implemented, and a problem of low alias management efficiency and heavy system processing load is resolved.

With reference to the third aspect, in a possible implementation, before the sending, by the functional alias management entity, a deactivation response message to the first client, the alias management method may further include: obtaining, by the functional alias management entity, subscription information of the user based on the identity of the user, where the subscription information includes indication information, and the indication information is used to indicate that the user has the alias deactivation right; or obtaining, by the functional alias management entity, policy information, and determining, based on the obtained policy information, that the user has the alias deactivation right, where the policy information includes an identity of a user that has the alias deactivation right.

With reference to the third aspect or the foregoing possible implementation, in another possible implementation, the alias management method may further include: when the user does not have the alias deactivation right, sending, by the functional alias management entity, a failure response message to the first client, where the failure response message may carry a failure cause, and the failure cause is used to indicate that authorization check on the user fails.

With reference to the third aspect or the foregoing possible implementation, in another possible implementation, when a service type of the alias requested to be deactivated is the same as a service type corresponding to the identity of the user, the alias that is successfully deactivated is the alias requested to be deactivated. The deactivation request message may further include the service type of the alias requested to be deactivated.

With reference to the third aspect or the foregoing possible implementation, in another possible implementation, the alias management method may further include: deleting, by the functional alias management entity, an association relationship between the identity of the user and the identity of the alias that is successfully deactivated.

With reference to the third aspect or the foregoing possible implementation, in another possible implementation, the alias management method may further include: sending, by the functional alias management entity, a notification message to a second client, where the notification message is used to notify the second client that the user successfully deactivates the alias that is successfully deactivated.

With reference to the third aspect or the foregoing possible implementation, in another possible implementation, the deactivation response message may further include a service type of the alias that is successfully deactivated.

With reference to the third aspect or the foregoing possible implementation, in another possible implementation, when the functional alias management entity is not disposed in a mission critical service server, the alias management method may further include: sending, by the functional alias management entity, a deactivation notification message to the mission critical service server, where the deactivation notification message includes the identity of the user and the identity of the alias that is successfully deactivated.

According to a fourth aspect, an embodiment of this application provides an alias management method, including:

receiving, by a functional alias management entity, a takeover request message sent by a first client, where the takeover request message includes an identity of a user and an identity of an alias requested to be taken over; and sending, by the functional alias management entity, a takeover response message to the first client when the user has an alias takeover right, where the takeover response message includes the identity of the user and an identity of an alias that is successfully taken over.

In the alias management method provided by this embodiment of this application, the functional alias management entity receives the takeover request message sent by the first client and including the identity of the user and the identity of the alias requested to be taken over; and when the user has the alias takeover right, the functional alias management entity sends, to the first client, the takeover response message including the identity of the user and the identity of the alias that is successfully taken over. After the functional alias management entity receives the takeover request message sent by the first client, when determining that the requester that requests to take over the alias has the alias takeover right, the functional alias management entity returns, to the first client, the takeover response message including the identity of the requester and the identity of the alias that is successfully taken over, without correspondingly processing a user configuration file in which the alias is configured. Therefore, alias takeover can be implemented, and a problem of low alias management efficiency and heavy system processing load is resolved.

With reference to the fourth aspect, in a possible implementation, before the sending, by the functional alias management entity, a takeover response message to the first client, the alias management method may further include: obtaining, by the functional alias management entity, subscription information of the user based on the identity of the user, where the subscription information includes indication information, and the indication information is used to indicate that the user has the alias takeover right; or obtaining, by the functional alias management entity, policy information, and determining, based on the obtained policy information, that the user has the alias takeover right, where the policy information includes an identity of a user that has the alias takeover right.

With reference to the fourth aspect or the foregoing possible implementation, in another possible implementation, the alias management method may further include: when the user does not have the alias takeover right, sending, by the functional alias management entity, a failure response message to the first client, where the failure response message may carry a failure cause, and the failure cause is used to indicate that authorization check on the user fails.

With reference to the fourth aspect or the foregoing possible implementation, in another possible implementation, when the alias requested to be taken over is an alias allowed to be taken over, the alias that is successfully taken over is the alias requested to be taken over; or when the alias requested to be taken over is an alias allowed to be taken over, and a service type of the alias requested to be taken over is the same as a service type corresponding to the identity of the user, the alias that is successfully taken over is the alias requested to be taken over. The takeover request message may further include the service type of the alias requested to be taken over.

With reference to the fourth aspect or the foregoing possible implementation, in another possible implementation, when the alias requested to be taken over is not an alias allowed to be taken over, sending, by the functional alias management entity, a failure response message to the first client, where the failure response message may carry a failure cause, and the failure cause is used to indicate that the alias requested to be taken over is not an alias allowed to be taken over.

With reference to the fourth aspect or the foregoing possible implementation, in another possible implementation, the alias management method may further include: deleting, by the functional alias management entity, an association relationship between the identity of the alias that is successfully taken over and an identity of a user using a second client, and sending a notification message to the second client, where the notification message is used to notify the second client that the user using the first client successfully takes over the alias that is successfully taken over, or used to instruct the second client to deactivate the alias that is successfully taken over, where the user using the second client is a user successfully activating the alias that is successfully taken over.

With reference to the fourth aspect or the foregoing possible implementation, in another possible implementation, the takeover response message may further include a service type of the alias that is successfully taken over.

With reference to the fourth aspect or the foregoing possible implementation, in another possible implementation, the alias management method may further include: sending, by the functional alias management entity, a takeover notification message to a mission critical service server, where the takeover notification message includes the identity of the user and the identity of the alias that is successfully taken over.

With reference to the fourth aspect or the foregoing possible implementation, in another possible implementation, the alias management method may further include: sending, by the functional alias management entity, a deactivation notification message to a mission critical service server, where the deactivation notification message includes the identity of the alias that is successfully taken over and the identity of the user.

According to a fifth aspect, an embodiment of this application provides a functional alias management entity, including: a receiving unit, configured to receive a registration request message sent by a first client, where the registration request message includes an identity of a user and a name of an alias requested to be registered; and a sending unit, configured to send a registration response message to the first client when the user has an alias registration right, where the registration response message includes the identity of the user, a name of an alias that is successfully registered, and an identity of the alias that is successfully registered.

With reference to the fifth aspect, in a possible implementation, the functional alias management entity may further include: an obtaining unit, configured to obtain subscription information of the user based on the identity of the user that is received by the receiving unit, where the subscription information includes indication information, and the indication information is used to indicate that the user has the alias registration right; or an obtaining unit, configured to obtain policy information, and a determining unit, configured to determine, based on the policy information obtained by the obtaining unit, that the user has the alias registration right, where the policy information includes an identity of a user that has the alias registration right.

With reference to the fifth aspect or the foregoing possible implementation, in another possible implementation, the functional alias management entity may further include: an allocation unit, configured to: when the name of the alias requested to be registered is not registered, allocate the identity to the alias requested to be registered, where the alias that is successfully registered is the alias requested to be registered.

With reference to the fifth aspect or the foregoing possible implementation, in another possible implementation, the registration request message further includes at least one of the following: a service type of the alias requested to be registered, an attribute of the alias requested to be registered, an application scope of the alias requested to be registered, and a valid time of the alias requested to be registered.

With reference to the fifth aspect or the foregoing possible implementation, in another possible implementation, the sending unit is further configured to send a notification message to a second client, where the notification message includes the name of the alias that is successfully registered, and the identity of the alias that is successfully registered.

With reference to the fifth aspect or the foregoing possible implementation, in another possible implementation, the notification message further includes at least one of the following: a service type of the alias that is successfully registered, an attribute of the alias that is successfully registered, an application scope of the alias that is successfully registered, and a valid time of the alias that is successfully registered.

According to a sixth aspect, an embodiment of this application provides a functional alias management entity, including: a receiving unit, configured to receive an activation request message sent by a first client, where the activation request message includes an identity of a user and an identity of an alias requested to be activated, and a sending unit, configured to send an activation response message to the first client when the user has an alias activation right, where the activation response message includes the identity of the user and an identity of an alias that is successfully activated.

With reference to the sixth aspect, in a possible implementation, the functional alias management entity may further include: an obtaining unit, configured to obtain subscription information of the user based on the identity of the user that is received by the receiving unit, where the subscription information includes indication information, and the indication information is used to indicate that the user has the alias activation right; or an obtaining unit, configured to obtain policy information, and a determining unit, configured to determine, based on the policy information obtained by the obtaining unit, that the user has the alias activation right, where the policy information includes an identity of a user that has the alias activation right.

With reference to the sixth aspect or the foregoing possible implementation, in another possible implementation, when the alias requested to be activated is not an alias that a plurality of users are allowed to simultaneously activate, and the alias requested to be activated is not activated, the alias that is successfully activated is the alias requested to be activated; or when the alias requested to be activated is an alias that a plurality of users are allowed to simultaneously activate, and a quantity of users who successfully activate the alias requested to be activated is greater than 0 and less than a maximum activation quantity, the alias that is successfully activated is the alias requested to be activated; or when the alias requested to be activated is not an alias that a plurality of users are allowed to simultaneously activate, the alias requested to be activated is not activated, and a service type of the alias requested to be activated is the same as a service type corresponding to the identity of the user, the alias that is successfully activated is the alias requested to be activated; or when the alias requested to be activated is an alias that a plurality of users are allowed to simultaneously activate, a quantity of users who successfully activate the alias requested to be activated is greater than 0 and less than a maximum activation quantity, and a service type of the alias requested to be activated is the same as a service type corresponding to the identity of the user, the alias that is successfully activated is the alias requested to be activated.

With reference to the sixth aspect or the foregoing possible implementation, in another possible implementation, the functional alias management entity may further include: a storage unit, configured to store an association relationship between the identity of the user and the alias that is successfully activated.

With reference to the sixth aspect or the foregoing possible implementation, in another possible implementation, the sending unit is further configured to send a notification message to a second client, where the notification message is used to notify the second client that the user successfully activates the alias that is successfully activated.

According to a seventh aspect, an embodiment of this application provides a functional alias management entity, including: a receiving unit, configured to receive a deactivation request message sent by a first client, where the deactivation request message includes an identity of a user and an identity of an alias requested to be deactivated; and a sending unit, configured to send a deactivation response message to the first client when the user has an alias deactivation right, where the deactivation response message includes the identity of the user and an identity of an alias that is successfully deactivated.

With reference to the seventh aspect, in a possible implementation, the functional alias management entity may further include: an obtaining unit, configured to obtain subscription information of the user based on the identity of the user, where the subscription information includes indication information, and the indication information is used to indicate that the user has the alias deactivation right; or an obtaining unit, configured to obtain policy information, and a determining unit, configured to determine, based on the policy information obtained by the obtaining unit, that the user has the alias deactivation right, where the policy information includes an identity of a user that has the alias deactivation right.

With reference to the seventh aspect or the foregoing possible implementation, in another possible implementation, when a service type of the alias requested to be deactivated is the same as a service type corresponding to the identity of the user, the alias that is successfully deactivated is the alias requested to be deactivated.

With reference to the seventh aspect or the foregoing possible implementation, in another possible implementation, the functional alias management entity may further include: a deletion unit, configured to delete an association relationship between the identity of the user and the identity of the alias that is successfully deactivated.

With reference to the seventh aspect or the foregoing possible implementation, in another possible implementation, the sending unit is further configured to send a notification message to a second client, where the notification message is used to notify the second client that the user successfully deactivates the alias that is successfully deactivated.

According to an eighth aspect, an embodiment of this application provides a functional alias management entity, including: a receiving unit, configured to receive a takeover request message sent by a first client, where the takeover request message includes an identity of a user and an identity of an alias requested to be taken over; and a sending unit, configured to send a takeover response message to the first client when the user has an alias takeover right, where the takeover response message includes the identity of the user and an identity of an alias that is successfully taken over.

With reference to the eighth aspect, in a possible implementation, the functional alias management entity may further include: an obtaining unit, configured to obtain subscription information of the user based on the identity of the user that is received by the receiving unit, where the subscription information includes indication information, and the indication information is used to indicate that the user has the alias takeover right, or an obtaining unit, configured to obtain policy information, and a determining unit, configured to determine, based on the policy information obtained by the obtaining unit, that the user has the alias takeover right, where the policy information includes an identity of a user that has the alias takeover right.

With reference to the eighth aspect or the foregoing possible implementation, in another possible implementation, when the alias requested to be taken over is an alias allowed to be taken over, the alias that is successfully taken over is the alias requested to be taken over; or when the alias requested to be taken over is an alias allowed to be taken over, and a service type of the alias requested to be taken over is the same as a service type corresponding to the identity of the user, the alias that is successfully taken over is the alias requested to be taken over.

With reference to the eighth aspect or the foregoing possible implementation, in another possible implementation, the functional alias management entity may further include: a deletion unit, configured to delete an association relationship between the identity of the alias that is successfully taken over and an identity of a user using a second client, where the user using the second client is a user successfully activating the alias that is successfully taken over; where the sending unit is further configured to send a notification message to the second client, where the notification message is used to notify the second client that the user using the first client successfully takes over the alias that is successfully taken over, or used to instruct the second client to deactivate the alias that is successfully taken over.

According to a ninth aspect, an embodiment of this application provides a functional alias management entity, including at least one processor and a memory, where the memory is configured to store a computer program, and when executing the computer program, the at least one processor implements the alias management method in any one of the first aspect or the possible implementations of the first aspect, or the second aspect or the possible implementations of the second aspect, or the third aspect or the possible implementations of the third aspect, or the fourth aspect or the possible implementations of the fourth aspect.

According to a tenth aspect, an embodiment of this application provides a computer readable storage medium, configured to store a computer program, where the computer program includes an instruction used to perform the alias management method in any one of the first aspect or the possible implementations of the first aspect, or the second aspect or the possible implementations of the second aspect, or the third aspect or the possible implementations of the third aspect, or the fourth aspect or the possible implementations of the fourth aspect.

According to an eleventh aspect, an embodiment of this application provides a chip system, where the chip system includes a processor, configured to support a functional alias management entity in implementing the functions in the foregoing aspects, for example, generating or processing data and/or information in the foregoing methods. In a possible design, the chip system further includes a memory, where the memory is configured to store a program instruction and data required by the functional alias management entity. The chip system may be formed by chips, or may include a chip and other discrete components.

DESCRIPTION OF EMBODIMENTS

Figure 1:
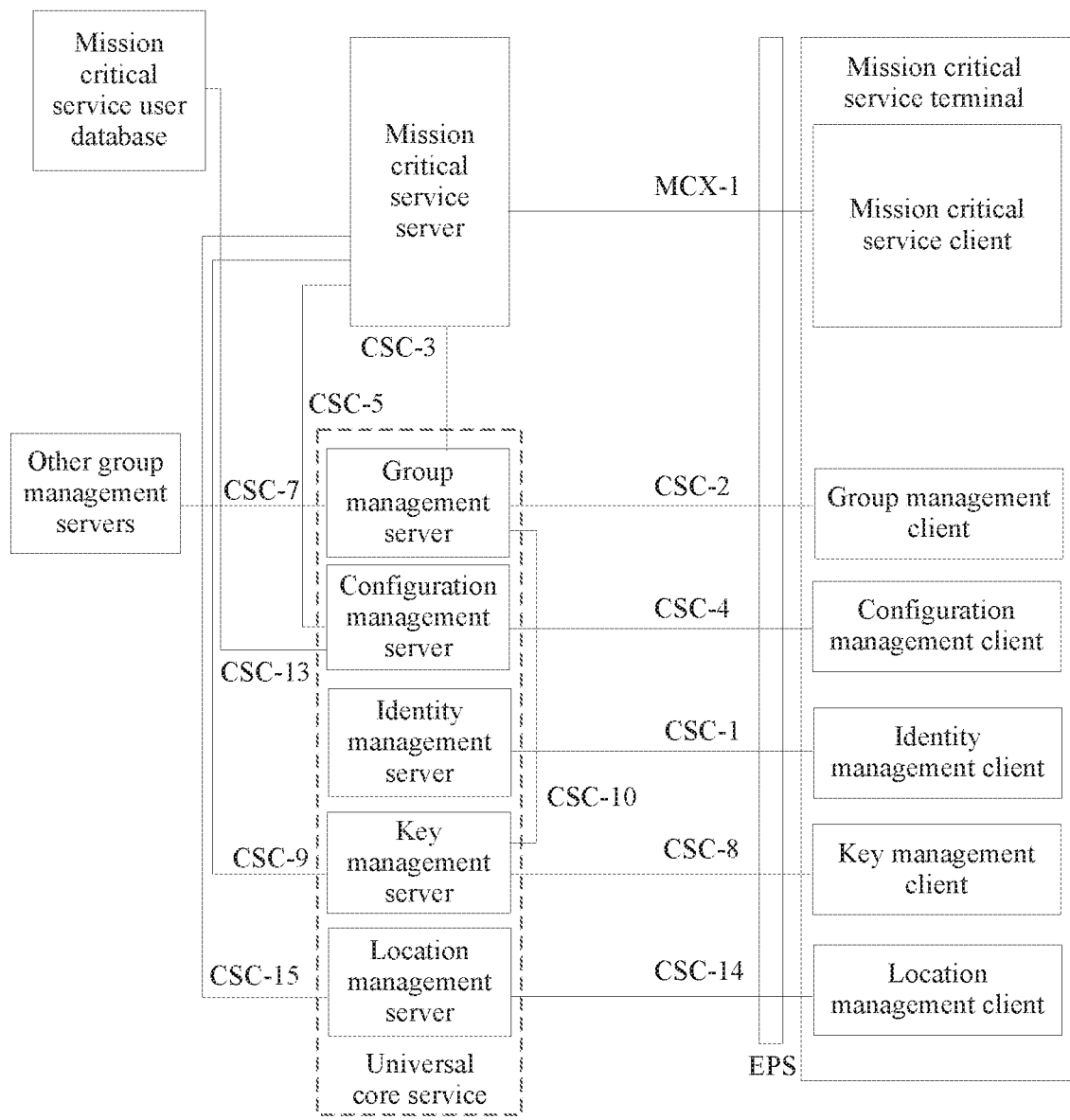
FIG. 1 is a schematic diagram of an architecture of a mission critical service application layer based on a 3GPP LTE system according to the prior art.

An architecture of a mission critical service application layer based on a 3GPP LTE system is shown in FIG. 1. A mission critical service user database (MC service user database) stores a user configuration file, and the user configuration file includes an identity of a user and one or more aliases corresponding to the identity. The alias is a name other than an official legal name or a standard name. For different services, a same user may use a same identity, or may use different identities. The identity of the user is bound with the alias corresponding to the identity of the user, and is stored in the user configuration file. For example, for an MCPTT service, the identity of the user is bound with the alias corresponding to the identity of the user; for an MCData service, the identity of the user is bound with the alias corresponding to the identity of the user. The user can use the alias only when a user configuration file including the alias is delivered by a system administrator by using a configuration management server (CMS) and a configuration management client (CMC) to a terminal used by the user. In addition, when management such as registration, activation, deactivation, or takeover needs to be performed on the alias, the user configuration file including the alias must be first processed correspondingly. For example, when an alias is registered dynamically and temporally in a system, alias registration can be completed only when the user configuration file is modified first or a new user configuration file is configured first.

In addition, the alias further has some information describing features of the alias, for example, uniqueness of the alias in the system, simultaneous use of the alias allowed for a plurality of users, and the identity of the user corresponding to the alias. In a railway application, information about an alias is specifically as follows:

1. An alias is an alias that may be selected by a user, and is bound with a duty or a mission of the user.

2. One user may simultaneously activate one or more aliases. Each activated alias is unique, and may be used as a service identity of the user for communicating with and addressing the user corresponding to the alias, that is, can support a routing function. For example, an alias is used to identify a driver of a specific train. For example, if there are two drivers on train TRAIN29, where an alias of a driver 1 is Driver1_TRAIN29, and an alias of a driver 2 is Driver2_TRAIN29, after the alias Driver1_TRAIN29 is successfully activated, the driver 1 on the train TRAIN29 can be addressed, and after the alias Driver2 TRAIN29 is successfully activated, the driver 2 on the train TRAIN29 can be addressed.

3. One alias may be allocated to a plurality of users based on service management configurations, or may be taken over by another authorized user based on service management configurations. The two requirements are mutually exclusive. To be specific, if an alias is allocated to a plurality of users, the alias cannot be taken over.

4. An authorized user may register a new alias.

In conclusion, based on the information describing alias features in the railway application, the following may be obtained: It is required that a user should be able to select an alias in the railway application freely; and the alias can be flexibly activated and deactivated, can support the routing function, can be taken over, and can be registered. Therefore, if the prior art is still used to preconfigure the alias in a user configuration file during system deployment, alias management efficiency is low, and system processing load is heavy.

To resolve a problem of low alias management efficiency and heavy system processing load, the embodiments of this application provide an alias management method. A basic principle of the alias management method is as follows: A functional alias management entity receives a management request message sent by a first client, where the management request message includes an identity of a user and information about an alias requested to be managed; and the functional alias management entity sends a management response message to the first client when the user has an alias management right, where the management response message includes the identity of the user, and information about an alias that is successfully managed. The management may be one or more of registration, activation, deactivation, takeover, and the like. After the functional alias management entity receives the management request message sent by the first client, when determining that the requester that requests to manage the alias has the alias management right, the functional alias management entity returns, to the first client, the management response message including the identity of the requester, and the information about the alias that is successfully managed, without correspondingly processing a user configuration file in which the alias is configured. Therefore, alias management can be implemented, and the problem of low alias management efficiency and heavy system processing load is resolved.

It should be noted that, in the embodiments of this application, the alias may also be referred to as a functional alias. In addition, "a plurality of" in the embodiments of this application may be two or more.

The following describes the embodiments of this application in detail with reference to the accompanying drawings.

Figure 2:
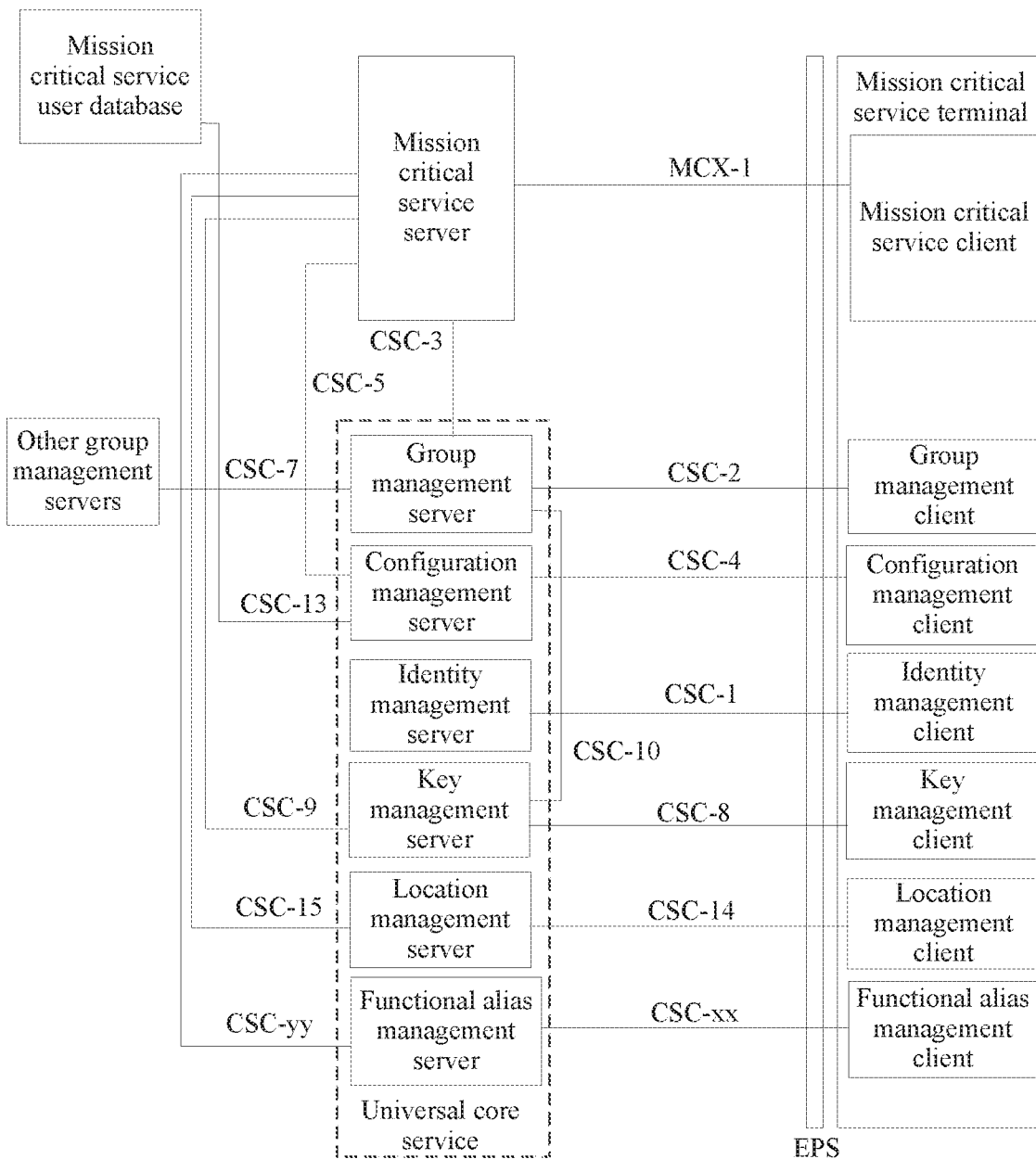
FIG. 2 is a simplified schematic diagram of a system architecture according to an embodiment of this application.

FIG. 2 is a simplified schematic diagram of a system architecture to which an embodiment of this application may be applied. As shown in FIG. 2, the system architecture may include a functional alias management server, a functional alias management client, and functional entities in the architecture shown in FIG. 1.

In a specific implementation, the functional alias management entity in this embodiment of this application may be integrated in any one of a mission critical service server (MC Service Server/MC server), a group management server, a configuration management server, an identity management server, a key management server, and a location management server included in the architecture shown in FIG. 1, or may be integrated in a functional alias management server.

In a specific implementation, the first client in this embodiment of this application may be integrated in any one of a mission critical service client MC Service Client/MC client), a group management client, a configuration management client, an identity management client, a key management client, and a location management client included in the architecture shown in FIG. 1, or may be integrated in a functional alias management client.

In this embodiment of this application, the functional alias management entity can store and maintain alias information of a system. The alias information may include one or a combination of the following: a name of an alias, an identity of the alias, an attribute of the alias, an identity of a user associated with the alias, a service type of the alias, an application scope of the alias, a valid time of the alias, and the like. The functional alias management entity may be configured to receive or reject operations initiated by the user, for example, alias registration, alias activation, alias deactivation, and alias takeover, and may be further configured to notify the user of a status change of the alias of the user, authorize the user to operate the alias, maintain an association relationship between the alias and the identity of the user, and the like. The first client is configured to initiate operation requests such as registration, activation, deactivation, and takeover of the alias to the functional alias management entity, and is further configured to receive a message for notifying the status change of the alias from the functional alias management entity.

In addition, the mission critical service server is mainly responsible for call control and media control, and is a logical entity. In a specific implementation, the mission critical service server may be an MCPTT server, an MCVideo server, an MCData server, or the like. The mission critical service client is a peer application layer entity of the mission critical service server, and is mainly responsible for processing an application layer transaction.

The group management server is mainly responsible for management of a group and maintenance of group information in the system, for example, creating or dissolving a group, changing a group member, or the like. The group management client is a peer application layer entity of the group management server, and is mainly responsible for initiating group creation or dissolving, group member operations, group information updating, and the like.

The configuration management server is mainly responsible for configuring service information and user information in the system, for example, delivering a user configuration file to a terminal used by the user. The configuration management client is a peer application layer entity of the configuration management server, and is mainly responsible for receiving configuration information delivered by the configuration management server.

The identity management server is configured to authorize and authenticate the identity of the user, determine whether the user is a valid user, and distribute a service access token to the identity management client. The identity management client is a peer application layer entity of the identity management server, and is configured to receive the service access token when the identity management server authorizes and authenticates the user.

The key management server is mainly responsible for managing a security key, for example, generating, distributing, or updating a security key. The key management client is a peer application layer entity of the key management server, and is mainly responsible for receiving and updating the security key, and the like.

The location management server is mainly responsible for managing a location of the user, for example, receiving and storing location information of the user, and providing the location information of the user for other authorized users for use. The location management client is a peer application layer entity of the location management server, and is mainly responsible for reporting the location information of the user, and obtaining location information of other users from the location management server.

The functional alias management server is mainly responsible for maintaining and updating information about aliases in the system, for example, adding an alias, removing an alias, updating an alias, retrieving an alias, and delivering an alias to the user. The functional alias management client is mainly responsible for retrieving an alias in the system, and receiving an alias delivered by the functional alias management server.

The mission critical service server and the mission critical service client use an MCX-1 interface to perform communication, where the MCX-1 interface, corresponding to different services, may be an MCPTT-1 interface or an MCVideo-1 interface or an MCData-1 interface. A corresponding CSC interface may be used for communication between functional entities. For example, the location management server and the location management client use a CSC-14 to perform communication; the alias management server and the alias management client use a CSC-xx to perform communication; the alias management server may further use a CSC-yy to perform communication with the mission critical service server.

It should be noted that, in this embodiment of this application, the system shown in FIG. 2 may be a system based on a mission critical service system. In addition, this embodiment of this application is applicable to an MCPTT service, an MCData service, an MCVideo service, a railway application service, or other similar services. This not specifically limited herein in this embodiment of this application.

Figure 3:
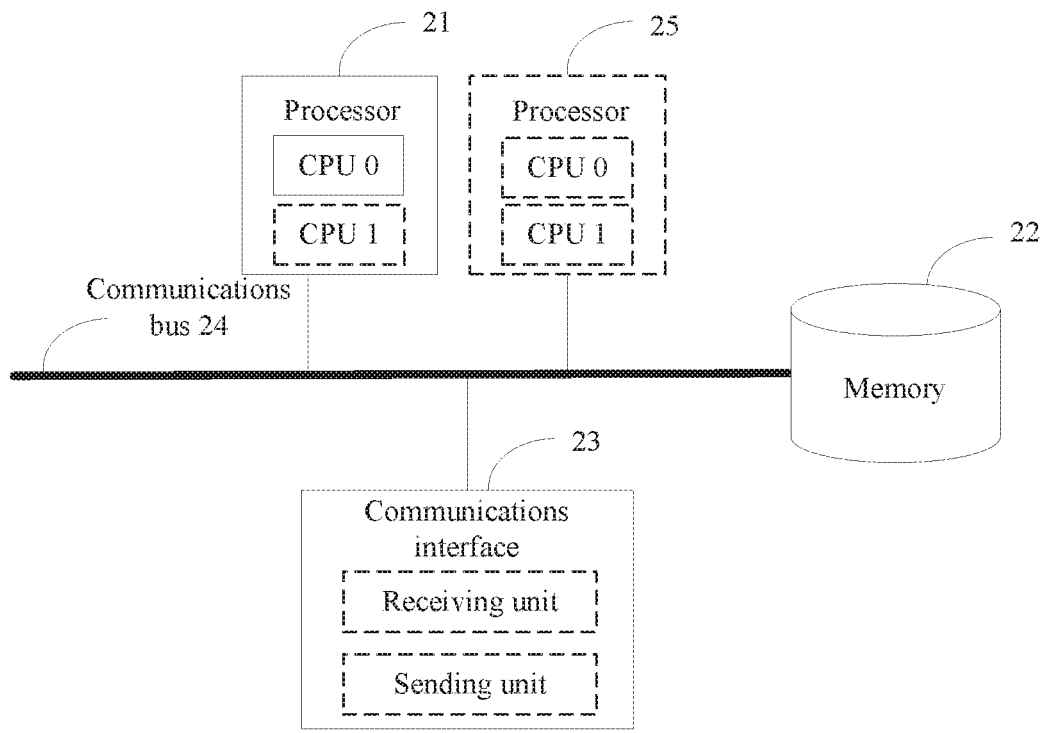
FIG. 3 is a schematic composition diagram of a functional alias management entity according to an embodiment of this application.

FIG. 3 is a schematic composition diagram of a functional alias management entity according to an embodiment of this application. As shown in FIG. 3, the functional alias management entity may include at least one processor 21, a memory 22, a communications interface 23, and a communications bus 24.

The following describes each component of the functional alias management entity in detail with reference to FIG. 3:

The processor 21 is a control center of the functional alias management entity, and may be a processor, or may be a collective term for a plurality of processing components. For example, the processor 21 is a central processing unit (CPU), or may be an application specific integrated circuit (ASIC), or is one or more integrated circuits configured to implement this embodiment of this application, for example, one or more microprocessors (DSP), or one or more field programmable gate arrays (FPGA).

The processor 21 may perform various functions of the functional alias management entity by running or executing a software program stored in the memory 22 and invoking data stored in the memory 22.

In a specific implementation, in an embodiment, the processor 21 may include one or more CPUs, for example, a CPU 0 and a CPU 1 shown in FIG. 3.

In a specific implementation, in an embodiment, the functional alias management entity may include a plurality of processors, for example, the processor 21 and a processor 25 in FIG. 3. Each of the processors may be a single-core (single-CPU) processor, or may be a multi-core (multi-CPU) processor. The processor herein may be one or more devices, circuits, and/or processing cores used for processing data (for example, a computer program instruction).

The memory 22 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 22 may exist independently, and is connected to the processor 21 by the communications bus 24. The memory 22 may also be integrated with the processor 21.

The memory 22 is configured to store a software program used to execute the solution of this application, where the software program is executed under control of the processor 21.

The communications interface 23 is a type of apparatus using any transceiver, and is configured to communicate with another device or a communications network, for example, an Ethernet, a radio access network (RAN), or a wireless local area network (WLAN). The communications interface 23 may include a receiving unit for implementing a receiving function and a sending unit for implementing a sending function.

The communications bus 24 may be an industry standard architecture (ISA) bus, a peripheral component interconnect (PCI) bus, an extended industry standard architecture (EISA) bus, or the like. The bus may be categorized as an address bus, a data bus, a control bus, or the like. For ease of indicating, the bus in FIG. 3 is indicated by only a bold line. However, this does not mean that only one bus or one type of bus exists.

A structure of the device shown in FIG. 3 does not constitute a limitation on the functional alias management entity. A quantity of components included may be greater or less than that shown in the figure, or some components are combined, or component arrangements are different.

It should be noted that, the alias management method provided by this embodiment of this application may be applied to management operations such as registration, activation, deactivation, and takeover of the alias. For ease of understanding by a person skilled in the art, the alias management method is specifically described by using the following embodiments.

Figure 4:
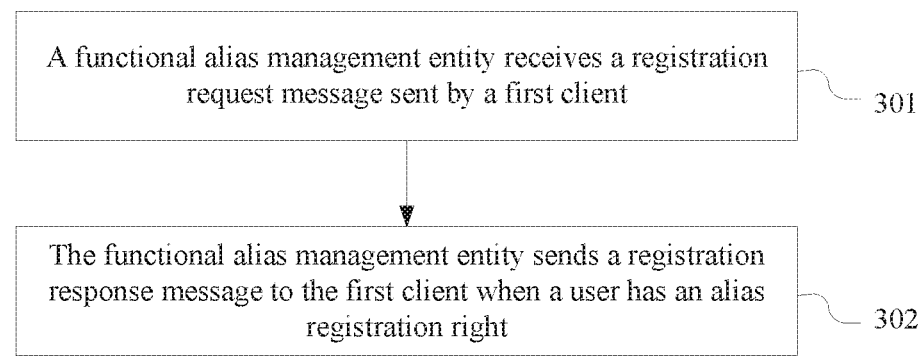
FIG. 4 is a flowchart of an alias management method according to an embodiment of this application.

FIG. 4 to FIG. 7 are flowcharts of alias management methods according to embodiments of this application. FIG. 4 is an alias management method for requesting to register an alias according to an embodiment of this application. As shown in FIG. 4, the method may include the following steps.

301. A functional alias management entity receives a registration request message sent by a first client.

The registration request message may include an identity of a user and a name of an alias requested to be registered. The registration request message is used to request to register the alias.

The user is a user using the first client.

It should be noted that, the user may be an authorized user. To be specific, the user has an alias registration right; otherwise, in subsequent authorization check, an authorization check failure is caused, and a registration procedure is terminated.

The identity of the user is any combination of a letter and/or a numeral and/or a special character, for uniquely identifying the user. For example, the identity of the user is an MC service ID, an MCPTT ID, an MCVideo ID, or an MCData ID.

For example, when the user needs to register a new alias, the first client used by the user may send, to the functional alias management entity, a registration request message carrying the identity of the user and a name of the alias requested to be registered, to request to register the alias.

It should be noted that, the first client may directly send the registration request message to the functional alias management entity, or may indirectly send the registration request message to the functional alias management entity by using another functional entity. In other words, the functional alias management entity may directly receive the registration request message sent by the first client, or may indirectly receive the registration request message sent by the first client. This is not specifically limited herein.

In a specific implementation, a registration request message may carry one or more identities of the user. Different identities correspond to different service types, for example, basic service types such as an MCPTT service, an MCData service, and an MCVideo service, and other service types such as a railway application and an enterprise application. A registration request message may also carry a name of one or more aliases requested to be registered. When a registration request message carries names of a plurality of aliases requested to be registered, the first client may request to register the plurality of aliases by sending one registration request message.

Further, the registration request message may include at least one of the following: a service type of the alias requested to be registered, an attribute of the alias requested to be registered, an application scope (apply scope) of the alias requested to be registered, and a valid time of the alias requested to be registered.

The service type of the alias is used to identify a service type that the alias is applicable, for example, an MCPTT service, an MCVideo service, an MCData service, and a railway application service. Generally, the service type of the alias and a service type corresponding to the identity of the user are the same, but may also be different.

The attribute of the alias may include at least one or a combination of the following: an indication about whether a plurality of users are allowed to simultaneously perform activation, a maximum quantity of users that are allowed to simultaneously perform activation, and an indication about whether takeover is allowed.

The application scope of the alias is used to identify the application scope of the alias, for example, which users can activate the alias. In a specific implementation, the application scope of the alias may be a user list, or may be a user role list, for example, a train driver or a train conductor. Certainly, when the registration request message does not include the application scope parameter of the alias, it may indicate that the alias is applicable only to the requester itself, or may indicate that the alias is applicable to all users in a system. When this parameter is absent, a specific application scope may be specified by a system operator.

The valid time of the alias is used to identify a valid time of the alias. In a specific implementation, the valid time of the alias may be implemented by using a timer, or may be an infinitely long time, that is, is valid permanently. When the registration request message does not include the valid time parameter of the alias, it may indicate that the valid time of the alias is infinitely long, that is, is valid permanently.

For example, specific examples of the name of the alias, the identity of the alias, the attribute of the alias, the service type of the alias, the application scope of the alias, and the valid time of the alias are shown in Table 1.

TABLE 1

| | |
|---|---|
| Name of the alias | Chief driver on train G20 |
| Identity of the alias | 049 + 2 + 0279 + 01 |
| Attribute of the alias | >Whether a plurality of users are allowed to simultaneously perform activation: Y<br>>>Maximum quantity of users that are allowed to simultaneously perform activation: 3<br>>Whether takeover is allowed: Y |
| Service type of the alias | MCPTT service, MCVideo service, and MCData service |
| Application scope of the alias | User list, such as user000@mcptt.fire, user 099@mcptt.fire, . . . , user100@mcvideo.fire, and user199@mcvideo.fire; or user role list, such as driver |
| Valid time of the alias | 20170101-20180101 |

The name of the alias may be any combination of a letter, a Chinese character, a numeral, a special character, and the like that the user easily recognizes, understands, and remembers, for example, the chief driver on train G20 in Table 1.

The identity of the alias may be the name of the alias, or a combination of a numeral and/or a letter and/or a special symbol in a specific format. For example, the identity of the alias may include an international code, a functional address, and a functional code; the international code is used to indicate a network that the user currently subscribes, for example, China 086 or France 033. The functional address includes a call type and a user number. The call type is a prefix, and is used to distinguish between different types of user numbers. For a network, the call type is also an indication about how to interpret a received number, for example, consider that the number corresponds to a train number, or a control room number, or an engine number. The functional code indicates a role associated with the functional address. The identity of the alias may be used for communicating with and addressing a user. For example, Identity of the alias=International code+Functional address (Call type+User number)+Functional code=049+2+0279+01. International code=049 (049 represents German), Call type=2 (2 represents a train), User number=0279 (0279 represents a train number), Functional code=01 (01 represents a chief driver).

302. The functional alias management entity sends a registration response message to the first client when a user has an alias registration right.

The registration response message may include the identity of the user, a name of an alias that is successfully registered, and an identity (ID) of the alias that is successfully registered.

For example, after receiving the registration response message, when the first client needs to use the alias, the first client may activate the alias that is successfully registered, so that the user using the first client can be addressed based on the identity of the alias that is successfully activated.

It should be noted that, when the name of the alias is unique in the whole system, the name of the alias may be used as the identity of the alias, or an identity that is unique in the whole system and can identify the alias may be allocated to the alias.

When the name of the alias requested to be registered is not registered, the alias that is successfully registered may be the alias requested to be registered.

For example, when a quantity of aliases requested to be registered is 1, and the alias requested to be registered is not registered, the functional alias management entity registers the alias for the user, and in this case, the alias requested to be registered is the alias that is successfully registered; or when a quantity of aliases requested to be registered is greater than 1, and at least one non-registered alias exists in the aliases requested to be registered, the functional alias management entity activates the at least one alias for the user, and in this case, the at least one non-registered alias is the alias that is successfully registered.

Further, the registration response message may further include a service type of the alias that is successfully registered.

An identity of the alias that is successfully registered may be preallocated by the system to the alias. To be specific, an association relationship between the name of the alias and the identity of the alias is prestored in the functional alias management entity. The identity of the alias may alternatively be allocated by the functional alias management entity to the alias, for example, allocated when the functional alias management entity determines that the user has the alias registration right, so that the user is addressed based on the identity of the alias.

In step 302, the functional alias management entity may determine, in the following manners, that the user has the alias registration right, but this is not limited.

In a first possible implementation, an attribute of the user is whether the user has the alias registration right, and an association relationship exists between the attribute and the identity of the user. After receiving the registration request message, the functional alias management entity may know, based on the identity of the user carried in the registration request message, whether the user has the alias registration right.

In a second possible implementation, before step 302, the method may further include: the functional alias management entity may perform authorization check on the user.

Specifically, before step 302, the method may further include: the functional alias management entity obtains alias right related information based on the identity of the user, and determines, based on the alias right related information, whether the user has the alias registration right. The alias right related information may be subscription information of the user, or may be policy information locally stored by the functional alias management entity.

In a possible specific implementation, the functional alias management entity obtains the subscription information of the user based on the identity of the user, where the subscription information of the user includes indication information, and the indication information is used to indicate whether the user has the alias registration right. The functional alias management entity may determine, based on the subscription information of the user, whether the user has the alias registration right. When the indication information included in the subscription information is used to indicate that the user has the alias registration right, the functional alias management entity may determine that the user has the alias registration right; or when the indication information included in the subscription information is used to indicate that the user does not have the alias registration right, the functional alias management entity may determine that the user does not have the alias registration right.

For example, in the subscription information, one bit may be used to indicate whether the user has the alias registration right. For example, "1" indicates that the user has the alias registration right, and "0" indicates that the user does not have the alias registration right. In addition, the subscription information may not only indicate whether the user has the alias registration right, but also indicate, when the user has the alias registration right, which alias (one or more aliases) the user has the alias registration right for. For example, only "1" in the subscription information is used to indicate that the user has the alias registration right. In this case, it may implicitly indicate that the user has the alias registration right for all aliases. For another example, the subscription information includes only a list of aliases that the user is allowed to register. In this case, it indicates that the user has the alias registration right, and has the alias registration right for only the aliases in the alias list.

In another possible specific implementation, the functional alias management entity obtains the policy information, and determines, based on the policy information, whether the user has the alias registration right, where the policy information includes an identity of a user that has the alias registration right.

Specifically, the functional alias management entity may obtain the locally stored policy information, where the policy information includes an identity of one or more users that have the alias registration right, and then the functional alias management entity may determine, by determining whether the identity of the user included in the registration request message is included in the policy information, whether the user has the alias registration right. When the identity of the user is included in the policy information, the functional alias management entity determines that the user has the alias registration right; or when the identity of the user is not included in the policy information, the functional alias management entity determines that the user does not have the alias registration right.

For example, the policy information may include only identities of users to indicate which users have the alias registration right. Certainly, the policy information may further indicate for which alias (one or more aliases) the user has the alias registration right. For example, the policy information includes only an identity list of users that have the alias registration right. In this case, it may implicitly indicate that the users have the alias registration right for all aliases. For another example, the policy information includes a list of aliases and an identity list of users corresponding to the aliases and having the alias registration right, to indicate that the users have the alias registration right for only the aliases in the alias list.

It should be noted that, in this embodiment of this application, authorization check may be further performed on the user based on both the subscription information of the user and the policy information locally stored by the functional alias management entity.

In a third possible implementation, before step 302, the method may further include: the functional alias management entity may perform authorization check on the user, and determine whether the alias requested to be registered is not registered.

Specifically, before step 302, the method may further include: when a quantity of aliases requested to be registered is 1, the functional alias management entity performs authorization check on the user, and determines whether the alias requested to be registered is not registered.

For example, if authorization check on the user succeeds and the alias requested to be registered is not registered, step 302 is performed; or when a quantity of names of aliases requested to be registered is greater than 1, the functional alias management entity performs authorization check on the user, determines whether at least one non-registered alias exists in the aliases requested to be registered, and if authorization check on the user succeeds and at least one non-registered alias exists in the aliases requested to be registered, performs step 302.

It should be noted that, an execution sequence between authorization check and determining whether the alias requested to be registered is not registered is random and not specifically limited herein. In addition, a specific implementation of performing authorization check on the user in the third implementation is similar to that in the second implementation, and is not described again herein.

In addition, when the subscription information or the policy information of the user not only indicates whether the user has the alias registration right, but also indicates which aliases the user has the alias registration right for, the functional alias management entity performs step 302 when determining that the user has the alias registration right for an alias requested to be registered and that the alias requested to be registered is not registered; or when the functional alias management entity determines that the user does not have the alias registration right for an alias requested to be registered or that the alias requested to be registered is already registered, it indicates that the alias requested to be registered is not allowed to be registered, and in this case, a failure response message may be returned to the first client.

In the alias management method provided by this embodiment of this application, the functional alias management entity receives the registration request message sent by the first client and including the identity of the user and the name of the alias requested to be registered; and when the user has the alias registration right, the functional alias management entity sends, to the first client, the registration response message including the identity of the user, the name of the alias that is successfully registered, and the identity of the alias that is successfully registered. After the functional alias management entity receives the registration request message sent by the first client, when determining that the requester that requests to register the alias has the alias registration right, the functional alias management entity returns, to the first client, the registration response message including the identity of the requester, the name of the alias that is successfully registered, and the identity of the alias that is successfully registered, without correspondingly processing a user configuration file in which the alias is configured. Therefore, alias registration can be implemented, and a problem of low alias management efficiency and heavy system processing load is resolved. In addition, the alias requested to be registered has no binding relationship with the service type, and can be flexibly operated.

Optionally, in an implementation scenario of the foregoing embodiment, before the functional alias management entity sends the registration response message to the first client in step 302, the method further includes:

when the name of the alias requested to be registered is not registered, the functional alias management entity allocates an identity to the alias requested to be registered.

For example, when the name of the alias requested to be registered is not registered, the functional alias management entity may generate an identity for the alias requested to be registered, and allocate the identity to the alias requested to be registered. When generating the identity for the alias requested to be registered, the functional alias management entity may generate the identity based on composition of the identity. For example, the identity of the alias includes three parts: an international code, a functional address, and a functional code. It should be noted that, for descriptions about the international code, the functional address, and the functional code, refer to the descriptions in step 301. Details are not described again herein.

For example, when a quantity of names of aliases requested to be registered is 1, and the alias requested to be registered is not registered, the functional alias management entity allocates the identity to the alias requested to be registered; or when a quantity of names of aliases requested to be registered is greater than 1, and at least one non-registered alias exists in the aliases requested to be registered, the functional alias management entity allocates the identity to the at least one non-registered alias.

In this case, the alias that is successfully registered in step 302 is the alias requested to be registered.

Optionally, in another implementation scenario of the foregoing embodiment, after step 302, the method may further include: the functional alias management entity sends a notification message to a second client.

The notification message may include the name of the alias that is successfully registered, and the identity of the alias that is successfully registered.

For example, the functional alias management entity sends, to the second client, the notification message including the name of the alias that is successfully registered, and the identity of the alias that is successfully registered, to notify the second client that the user successfully registers the alias that is successfully registered.

The second client may be a client used by all users in the system, or may be a client used by a user in an application scope of the alias that is successfully registered. The application scope may be carried in the registration request message, or may be allocated by the functional alias management entity to the alias.

For example, when the application scope of the alias is a user list, the functional alias management entity may directly send a notification message to a second client used by a user in the user list; when the application scope of the alias is a user role list, the functional alias management entity may send, by using another functional entity such as a mission critical service server, a notification message to a second client used by a user corresponding to a role in the user role list.

Optionally, when the functional alias management entity is not configured in the mission critical service server, the functional alias management entity may further send, to the mission critical service server, a notification message including the name of the alias that is successfully registered, and the identity of the alias that is successfully registered, so that the mission critical service server can subsequently recognize the alias that is successfully registered, and further address a user that activates the alias.

Further, the notification message may further include at least one of the following: the service type of the alias that is successfully registered, an attribute of the alias that is successfully registered, the application scope of the alias that is successfully registered, and a valid time of the alias that is successfully registered. The parameters may be received by the first client, or may be allocated by the functional alias management entity. This is not specifically limited herein.

In an alternative solution of the foregoing embodiment, a step for replacing step 302 includes:

when the user does not have the alias registration right, the functional alias management entity returns a failure response message to the first client; or when the user has the alias registration right, and the name of the alias requested to be registered is already registered, the functional alias management entity returns a failure response message to the first client.

Further, the failure response message may include a failure cause. For example, when the user does not have the alias registration right, the failure cause is that authorization check fails. When the first client receives the failure response message carrying the failure cause that authorization check fails, the first client may request a higher right, so as to register the alias. For another example, when the user has the alias registration right, and the name of the alias requested to be registered is already registered, the failure cause is that the name of the alias requested to be registered is already registered. When the first client receives the failure cause that the name of the alias requested to be registered is already registered, the first client may request to register another alias.

It should be noted that, for terms used in this application, mutual reference may be made in different embodiments.

Figure 5:
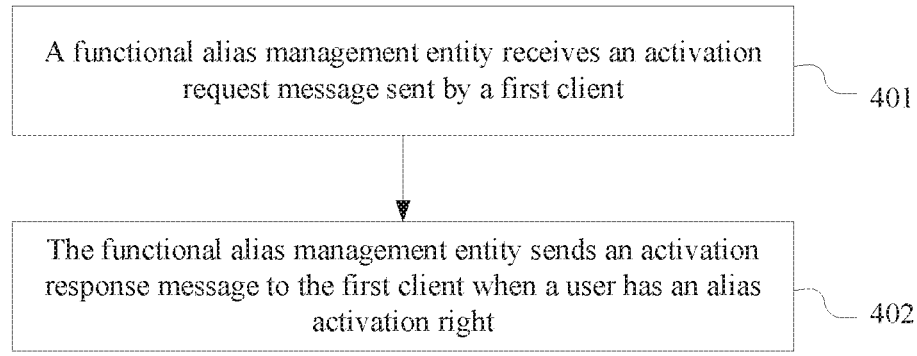
FIG. 5 is a flowchart of another alias management method according to an embodiment of this application.

FIG. 5 is an alias management method for requesting to activate an alias according to an embodiment of this application. As shown in FIG. 5, the method may include the following steps.

401. A functional alias management entity receives an activation request message sent by a first client.

The activation request message may include an identity of a user and an identity of an alias requested to be activated. The activation request message is used to request to activate the alias.

The user is a user using the first client.

For example, when the user needs to use the alias, the first client used by the user may send, to the functional alias management entity, the activation request message carrying the identity of the user and the identity of the alias requested to be activated, to request to activate the alias.

It should be noted that, the first client may directly send the activation request message to the functional alias management entity, or may indirectly send the activation request message to the functional alias management entity by using another functional entity. In other words, the functional alias management entity may directly receive the activation request message sent by the first client, or may indirectly receive the activation request message sent by the first client. This is not specifically limited herein.

In a specific implementation, an activation request message may carry one or more identities of the user. Different identities correspond to different service types, for example, basic service types such as an MCPTT service, an MCData service, and an MCVideo service, and other service types such as a railway application and an enterprise application. An activation request message may also carry an identity of one or more aliases requested to be activated. When an activation request message carries identities of a plurality of aliases requested to be activated, the first client may request, by sending one activation request message, to activate the plurality of aliases.

Further, the activation request message may further include a service type of the alias.

402. The functional alias management entity sends an activation response message to the first client when a user has an alias activation right.

The activation response message may include the identity of the user and an identity of an alias that is successfully activated.

For example, when the user has the alias activation right, the functional alias management entity may send, to the first client, the activation response message carrying the identity of the user and the identity of the alias that is successfully activated, so that the user using the first client can be addressed based on the identity of the alias that is successfully activated.

Further, the registration response message may further include a service type of the alias that is successfully activated.

For example, when the alias requested to be activated is not an alias that a plurality of users are allowed to simultaneously activate, and the alias requested to be activated is not activated, the functional alias management entity activates the alias for the user, and in this case, the alias requested to be activated is the alias that is successfully activated; or when the alias requested to be activated is an alias that a plurality of users are allowed to simultaneously activate, and a quantity of users who successfully activate the alias requested to be activated is greater than 0 and less than a maximum activation quantity, the functional alias management entity activates the alias for the user, and in this case, the alias requested to be activated is the alias that is successfully activated; or when the alias requested to be activated is not an alias that a plurality of users are allowed to simultaneously activate, the alias requested to be activated is not activated, and the service type of the alias requested to be activated is the same as a service type corresponding to the identity of the user, the functional alias management entity activates the alias for the user, and in this case, the alias requested to be activated is the alias that is successfully activated; or when the alias requested to be activated is an alias that a plurality of users are allowed to simultaneously activate, a quantity of users who successfully activate the alias requested to be activated is greater than 0 and less than a maximum activation quantity, and the service type of the alias requested to be activated is the same as a service type corresponding to the identity of the user, the functional alias management entity activates the alias for the user, and in this case, the alias requested to be activated is the alias that is successfully activated.

In step 402, the functional alias management entity may determine, in the following manners, that the user has the alias activation right, but this is not limited.

In a first possible implementation, an attribute of the user is whether the user has the alias activation right, and an association relationship exists between the attribute and the identity of the user. After receiving the activation request message, the functional alias management entity may know, based on the identity of the user carried in the activation request message, whether the user has the alias activation right.

In a second possible implementation, before step 402, the method may further include: the functional alias management entity may perform authorization check on the user.

Specifically, before step 402, the method may further include: the functional alias management entity obtains alias right related information based on the identity of the user, and determines, based on the alias right related information, whether the user has the alias activation right. The alias right related information may be subscription information of the user, or may be policy information locally stored by the functional alias management entity.

In a possible specific implementation, the functional alias management entity obtains the subscription information of the user based on the identity of the user, where the subscription information of the user includes indication information, and the indication information is used to indicate whether the user has the alias activation right. The functional alias management entity may determine, based on the subscription information of the user, whether the user has the alias activation right. When the indication information included in the subscription information is used to indicate that the user has the alias activation right, the functional alias management entity may determine that the user has the alias activation right: or when the indication information included in the subscription information is used to indicate that the user does not have the alias activation right, the functional alias management entity may determine that the user does not have the alias activation right.

In another possible specific implementation, the functional alias management entity obtains the policy information, and determines, based on the policy information and the identity of the user, whether the user has the alias activation right, where the policy information includes an identity of a user that has the alias activation right. When the identity of the user is included in the policy information, the functional alias management entity determines that the user has the alias activation right; or when the identity of the user is not included in the policy information, the functional alias management entity determines that the user does not have the alias activation right.

It should be noted that, in this embodiment of this application, authorization check may be further performed on the user based on both the subscription information of the user and the policy information locally stored by the functional alias management entity.

In a third possible implementation, before step 402, the method may further include: the functional alias management entity may perform authorization check on the user; and after the authorization check succeeds, the functional alias management entity may determine whether the alias requested to be activated is an alias that a plurality of users are allowed to simultaneously activate, and determine whether the alias requested to be activated is not activated.

For example, if the alias requested to be activated is not an alias that a plurality of users are allowed to simultaneously activate, and the alias requested to be activated is not activated, step 402 is performed; or if the alias requested to be activated is an alias that a plurality of users are allowed to simultaneously activate, and a quantity of users who successfully activate the alias requested to be activated is greater than 0 and less than the maximum activation quantity, step 402 may also be performed.

Further, when the activation request message includes the service type of the alias requested to be activated, it may be further determined that the service type of the alias requested to be activated is the same as the service type corresponding to the identity of the user.

For example, if the alias requested to be activated is not an alias that a plurality of users are allowed to simultaneously activate, the alias requested to be activated is not activated, and the service type of the alias requested to be activated is the same as the service type corresponding to the identity of the user, step 402 is performed; or if the alias requested to be activated is an alias that a plurality of users are allowed to simultaneously activate, a quantity of users who successfully activate the alias requested to be activated is greater than 0 and less than the maximum activation quantity, and the service type of the alias requested to be activated is the same as the service type corresponding to the identity of the user, step 402 is performed.

A specific implementation of performing authorization check on the user in the third implementation is similar to that in the second manner, and is not described again herein.

It should be noted that, when the activation request message includes identities of two or more aliases requested to be activated, after authorization check succeeds, the foregoing determining operation may be performed on an identity of each alias requested to be activated, and step 402 is performed when the foregoing determining operation is performed on the identity of each alias requested to be activated and at least one alias requested to be activated is an alias that is successfully activated. In addition, if no alias that is successfully activated exists in the aliases requested to be activated, a failure response message may be returned to the first client.

For example, whether the alias requested to be activated is an alias that a plurality of users are allowed to simultaneously activate, and when the alias requested to be activated is an alias that a plurality of users are allowed to simultaneously activate, a maximum activation quantity allowed to perform activation is included in an attribute of the alias requested to be activated. In addition, the functional alias management entity may locally maintain a piece of activating user information dynamically to learn of a quantity of users that activate the alias at a current moment, for example, may locally store a list of activating users. For example, as shown in Table 2, identities of users who successfully activate an alias whose identity is xxx are a user service ID 1, a user service ID 2, and a user service ID 3, and identities of users who successfully activate an alias whose identity is yyy are a user service ID 7, a user service ID 9, and a user service ID 10.

TABLE 2

| Identity of the alias | List of activating users |
|---|---|
| xxx | user service ID 1, user service ID 2, and user service ID 3 |
| yyy | user service ID 7, user service ID 9, and user service ID 10 |

In the alias management method provided by this embodiment of this application, the functional alias management entity receives the activation request message sent by the first client and including the identity of the user and the identity of the alias requested to be activated; and when the user has the alias activation right, the functional alias management entity sends, to the first client, the activation response message including the identity of the user and the identity of the alias that is successfully activated. After the functional alias management entity receives the activation request message sent by the first client, when determining that the requester that requests to activate the alias has the alias activation right, the functional alias management entity returns, to the first client, the activation response message including the identity of the requester and the identity of the alias that is successfully activated, without correspondingly processing a user configuration file in which the alias is configured. Therefore, alias activation can be implemented, and a problem of low alias management efficiency and heavy system processing load is resolved. In addition, because the alias requested to be activated is not bound with the user configuration file, no necessary relationship exists between activation of the alias and activation of the user configuration file, and flexibility of the alias operation is improved.

Optionally, in an implementation scenario of the foregoing embodiment, after step 402, the method may further include: the functional alias management entity stores an association relationship between the identity of the user and the alias that is successfully activated.

Specifically, when the functional alias management entity determines that the user has the alias activation right, the functional alias management entity may further store the association relationship between the identity of the user and the alias that is successfully activated, indicating that the user successfully activates the alias. For example, the functional alias management entity may store the identity of the user in activating user information corresponding to the alias. For example, the identity of the alias that the user requests to activate is xxx, and the identity of the user is a user service ID 4; when the alias requested to be activated is successfully activated, the functional alias management entity may add the identity user service ID 4 of the user to a corresponding position in the activation list shown in Table 2.

Optionally, in another implementation scenario of the foregoing embodiment, after step 402, the method may further include: the functional alias management entity sends a notification message to a second client.

Specifically, when the alias requested to be activated is successfully activated, and another user also successfully activates the alias simultaneously, the functional alias management entity may send the notification message to the second client, to notify the second client that the user successfully activates the alias, and may further address the user.

The second client may be a client used by the user who successfully activates the alias. The user successfully activating the alias may be a user that currently still keeps a state of activating the alias, and is not a user that previously activated the alias and subsequently deactivated the alias. For example, the second client may be a client used by a user corresponding to an identity of another user that is included in the activating user information corresponding to the alias.

Further, when the functional alias management entity is not configured in a mission critical service server, the functional alias management entity may send an activation notification message to the mission critical service server.

The activation notification message may include the identity of the alias that is successfully activated and the identity of the user, and an association relationship exists between the identity of the alias that is successfully activated and the identity of the user, so that the mission critical service server can route a message and address the user subsequently.

When the functional alias management entity is not configured in a functional alias management server, the functional alias management entity may send an activation notification message to the functional alias management server, so that the alias management server maintains and updates alias information based on the received activation notification message. The activation notification message is similar to the activation notification message sent by the functional alias management entity to the mission critical service server when the functional alias management entity is not configured in the mission critical service server, and is not described again herein.

In an alternative solution of the foregoing embodiment, the following step is used to replace step 402:

When the user does not have the alias activation right, the functional alias management entity returns a failure response message to the first client, or when the user has the alias activation right, and no alias that is successfully activated exists in the alias requested to be activated, the functional alias management entity returns a failure response message to the first client.

For example, when the alias requested to be activated is not an alias that a plurality of users are allowed to simultaneously activate, and the alias requested to be activated is already activated, the alias requested to be activated is an alias that is not successfully activated.

Further, the failure response message may include a failure cause. For example, when the user does not have the alias activation right, the failure cause is that authorization check fails. When the first client receives the failure response message carrying the failure cause that authorization check fails, the first client may request a higher right, so as to activate the alias. For another example, when the user has the alias activation right, the alias requested to be activated is not an alias that a plurality of users are allowed to simultaneously activate, and the alias requested to be activated is already activated, the failure cause is that the alias requested to be activated is not an alias that a plurality of users are allowed to simultaneously activate, and that the alias requested to be activated is already activated. When the first client receives the failure cause that the alias requested to be activated is not an alias that a plurality of users are allowed to simultaneously activate, and that the alias requested to be activated is already activated, the first client may request to take over the alias requested to be activated, to implement activation of the alias. For another example, when the user has the alias activation right, the alias requested to be activated is an alias that a plurality of users are allowed to simultaneously activate, and a quantity of users who successfully activate the alias requested to be activated is greater than the maximum activation quantity, the failure cause is that the quantity of users who successfully activate the alias requested to be activated is greater than the maximum activation quantity. When the first client receives the failure cause that the quantity of users who successfully activate the alias requested to be activated is greater than the maximum activation quantity, the first client may request a higher alias priority right, and further achieve a purpose of successfully activating the alias requested to be activated.

It should be noted that, for detailed descriptions in this embodiment of this application, reference may be made to detailed descriptions of corresponding content in the embodiment shown in FIG. 4, and a difference lies only in that "register" is correspondingly replaced with "activate". Details are not described again in this embodiment of this application.

It should be noted that, the embodiment shown in FIG. 5 may be based on the alias preconfigured by the system, or based on a newly registered alias shown in FIG. 4. When the user needs to use the alias, the user may activate the alias.

Figure 6:
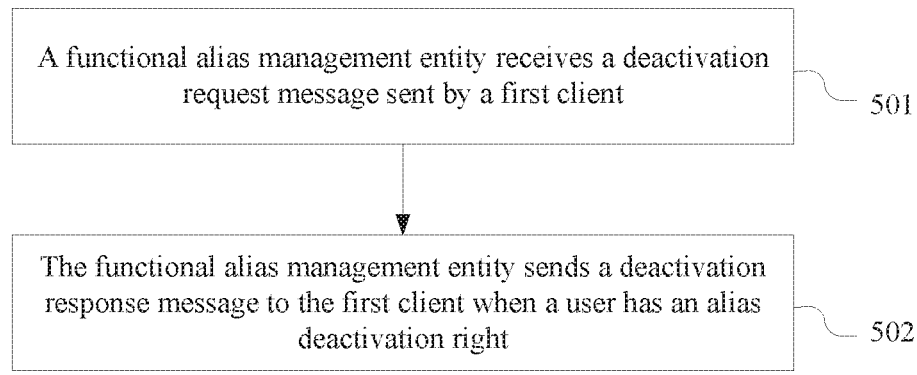
FIG. 6 is a flowchart of another alias management method according to an embodiment of this application.

FIG. 6 is an alias management method for requesting to deactivate an alias according to an embodiment of this application. As shown in FIG. 6, the method may include the following steps.

501. A functional alias management entity receives a deactivation request message sent by a first client.

The deactivation request message may include an identity of a user and an identity of an alias requested to be deactivated. The deactivation request message is used to request to deactivate the alias.

The user is a user using the first client.

For example, when the user needs to deactivate the alias, the first client used by the user may send, to the functional alias management entity, the deactivation request message carrying the identity of the user and the identity of the alias requested to be deactivated, to request to deactivate the alias.

In a specific implementation, a deactivation request message may carry one or more identities of the user. A deactivation request message may also carry an identity of one or more aliases requested to be deactivated. Further, the deactivation request message may further include a service type of the alias requested to be deactivated.

502. The functional alias management entity sends a deactivation response message to the first client when a user has an alias deactivation right.

The deactivation response message may include the identity of the user and an identity of an alias that is successfully deactivated.

For example, when the deactivation request message includes identities of a plurality of aliases requested to be deactivated, the deactivation response message includes identities of all aliases that are successfully deactivated in the plurality of aliases requested to be deactivated. Further, the deactivation response message may further include a service type of the alias that is successfully deactivated.

For example, when the user has the alias deactivation right, the functional alias management entity may send, to the first client, the deactivation response message carrying the identity of the user and the identity of the alias that is successfully deactivated, so that the first client knows that the alias requested to be deactivated is already successfully deactivated.

In step 502, the functional alias management entity may determine, in the following manners, that the user has the alias deactivation right, but this is not limited.

In a first possible implementation, an attribute of the user is whether the user has the alias deactivation right, and an association relationship exists between the attribute and the identity of the user. After receiving the deactivation request message, the functional alias management entity may know, based on the identity of the user carried in the deactivation request message, whether the user has the alias deactivation right.

In a second possible implementation, before step 502, the method may further include: the functional alias management entity may perform authorization check on the user.

Specifically, before step 502, the method may further include: the functional alias management entity obtains alias right related information based on the identity of the user, and determines, based on the alias right related information, whether the user has the alias deactivation right. The alias right related information may be subscription information of the user, or may be policy information locally stored by the functional alias management entity.

In a possible implementation, the functional alias management entity obtains the subscription information of the user based on the identity of the user, where the subscription information of the user includes indication information, and the indication information is used to indicate whether the user has the alias deactivation right. The functional alias management entity may determine, based on the subscription information of the user, whether the user has the alias deactivation right. When the indication information included in the subscription information is used to indicate that the user has the alias deactivation right, the functional alias management entity may determine that the user has the alias deactivation right; or when the indication information included in the subscription information is used to indicate that the user does not have the alias deactivation right, the functional alias management entity may determine that the user does not have the alias deactivation right.

In another possible specific implementation, the functional alias management entity obtains the policy information, and determines, based on the policy information and the identity of the user, whether the user has the alias deactivation right, where the policy information includes an identity of a user that has the alias deactivation right. When the identity of the user is included in the policy information, the functional alias management entity determines that the user has the alias deactivation right; or when the identity of the user is not included in the policy information, the functional alias management entity determines that the user does not have the alias deactivation right.

It should be noted that, in this embodiment of this application, authorization check may be further performed on the user based on both the subscription information of the user and the policy information locally stored by the functional alias management entity.

In a third possible implementation, when the deactivation request message further includes the service type of the alias requested to be deactivated, before step 502, the method may further include: the functional alias management entity may perform authorization check on the user; and after the authorization check succeeds, the functional alias management entity determines whether the service type of the alias requested to be deactivated is the same as a service type corresponding to the identity of the user. For example, when the service type of the alias requested to be deactivated is the same as the service type corresponding to the identity of the user, the alias requested to be deactivated is the alias that is successfully deactivated.

In the alias management method provided by this embodiment of this application, the functional alias management entity receives the deactivation request message sent by the first client and including the identity of the user and the identity of the alias requested to be deactivated; and when the user has the alias deactivation right, the functional alias management entity sends, to the first client, the deactivation response message including the identity of the user and the identity of the alias that is successfully deactivated. After the functional alias management entity receives the deactivation request message sent by the first client, when determining that the requester that requests to deactivate the alias has the alias deactivation right, the functional alias management entity returns, to the first client, the deactivation response message including the identity of the requester and the identity of the alias that is successfully deactivated, without correspondingly processing a user configuration file in which the alias is configured. Therefore, alias deactivation can be implemented, and a problem of low alias management efficiency and heavy system processing load is resolved.

Optionally, in an implementation scenario of the foregoing embodiment, after step 502, the method further includes: the functional alias management entity deletes an association relationship between the identity of the user and the identity of the alias that is successfully deactivated.

Specifically, when the functional alias management entity determines that the user has the alias deactivation right, the functional alias management entity may delete the association relationship between the identity of the user and the identity of the alias that is successfully deactivated, that is, successfully deactivate the alias for the user. For example, the functional alias management entity may delete the identity of the user from activating user information corresponding to the alias that is successfully deactivated. For example, if the identity of the alias that the user requests to deactivate is xxx, and the identity of the user is a user service ID 1, the user service ID 1 in Table 2 shown in another embodiment of this application may be deleted.

Optionally, in another implementation scenario of the foregoing embodiment, after step 502, the method further includes: the functional alias management entity sends a notification message to a second client.

For example, when the alias that is successfully deactivated is successfully deactivated by another user, the functional alias management entity may send the notification message to the second client, to notify the second client that the user successfully deactivates the alias that is successfully deactivated.

The second client may be a client used by another user who successfully activates the alias that is successfully deactivated. The user successfully activating the alias that is successfully deactivated may be a user that currently still keeps a state of activating the alias, and is not a user that previously activated the alias and subsequently deactivated the alias. For example, the second client may be a client used by a user corresponding to an identity of another user that is included in activating user information corresponding to the alias that is successfully deactivated, and the activating user information is activating user information at a current moment.

Further, when the functional alias management entity is not configured in a mission critical service server, the functional alias management entity may send a deactivation notification message to the mission critical service server. For example, after receiving the deactivation notification message, the mission critical service server may perform call control and media control based on the deactivation notification message.

The deactivation notification message may include the identity of the user and the identity of the alias that is successfully deactivated. An association relationship exists between the identity of the alias that is successfully deactivated and the identity of the user.

When the functional alias management entity is not configured in a functional alias management server, the functional alias management entity may send a deactivation notification message to the functional alias management server, so that the alias management server maintains and updates alias information based on the received deactivation notification message. The deactivation notification message is similar to the deactivation notification message sent by the functional alias management entity to the mission critical service server when the functional alias management entity is not configured in the mission critical service server, and is not described again herein.

In an alternative solution of the foregoing embodiment, the following step may be used to replace step 502:

When the user does not have the alias deactivation right, the functional alias management entity returns a failure response message to the first client.

Further, the failure response message may include a failure cause. For example, when the functional alias management entity determines that the user does not have the alias deactivation right, the failure cause is that authorization check fails. When the first client receives the failure response message carrying the failure cause that authorization check fails, the first client may request a higher right, so as to deactivate the alias. For another example, when the functional alias management entity determines that the user has the alias deactivation right, and the alias requested to be deactivated is not allowed to be deactivated, the failure cause is that the alias requested to be deactivated is not allowed to be deactivated.

It should be noted that, for detailed descriptions in this embodiment of this application, reference may be made to detailed descriptions of corresponding content in the embodiment shown in FIG. 5, and a difference lies only in that "activate" is replaced with "deactivate". Details are not described again in this embodiment of this application.

It should be noted that, when the user needs to deactivate an alias, the method shown in FIG. 6 may be used to perform a deactivation operation on the alias. The deactivation method may be performed on a basis of the method shown in FIG. 5, and is not limited.

In an embodiment of this application, when a user needs to take over an alias, a takeover operation may be performed on the alias.

Figure 7:
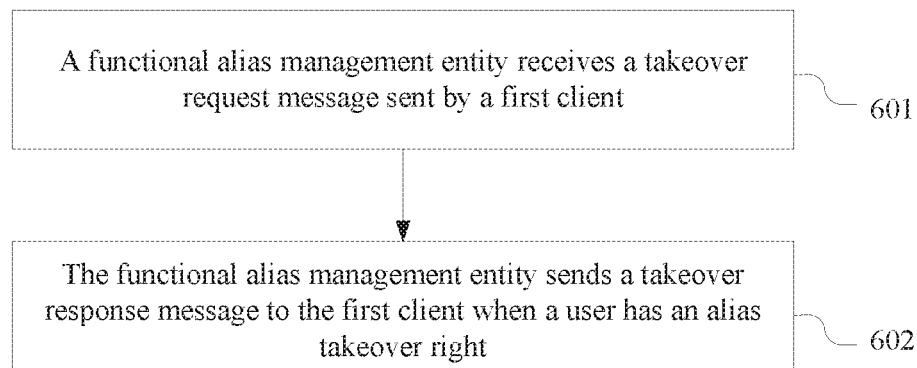
FIG. 7 is a flowchart of another alias management method according to an embodiment of this application.

FIG. 7 is an alias management method for requesting to take over an alias according to an embodiment of this application. As shown in FIG. 7, the method may include the following steps.

601. A functional alias management entity receives a takeover request message sent by a first client.

The takeover request message may include an identity of a user and an identity of an alias requested to be taken over. The takeover request message is used to request to take over the alias.

The user is a user using the first client.

For example, when the user needs to take over the alias, the first client used by the user may send, to the functional alias management entity, the takeover request message carrying the identity of the user and the identity of the alias requested to be taken over, to request to take over the alias.

It should be noted that, the first client may directly send the takeover request message to the functional alias management entity, or may indirectly send the takeover request message to the functional alias management entity by using another functional entity. In other words, the functional alias management entity may directly receive the takeover request message sent by the first client, or may indirectly receive the takeover request message sent by the first client. This is not specifically limited herein.

In a specific implementation, a takeover request message may carry one or more identities of the user. Different identities correspond to different service types, for example, basic service types such as an MCPTT service, an MCData service, and an MCVideo service, and other service types such as a railway application and an enterprise application.

A takeover request message may also carry an identity of one or more aliases requested to be taken over.

Further, the takeover request message may further include a service type of the alias requested to be taken over.

602. The functional alias management entity sends a takeover response message to the first client when a user has an alias takeover right.

The takeover response message may include the identity of the user and an identity of an alias that is successfully taken over.

For example, when the takeover request message includes identities of a plurality of aliases requested to be taken over, the takeover response message includes identities of all aliases that are successfully taken over in the plurality of aliases requested to be taken over.

For example, when the user has the alias takeover right, the functional alias management entity may send, to the first client, the takeover response message carrying the identity of the user and the identity of the alias that is successfully taken over, so that the first client knows that the alias requested to be taken over is already successfully taken over, and subsequently may address, based on the identity of the alias that is successfully taken over, the user using the first client.

Further, the takeover response message may further include a service type of the alias that is successfully taken over.

For example, when the alias requested to be taken over is an alias allowed to be taken over, the alias requested to be taken over is the alias that is successfully taken over; or when the alias requested to be taken over is an alias allowed to be taken over and the service type of the alias requested to be taken over is the same as a service type corresponding to the identity of the user, the alias requested to be taken over is the alias that is successfully taken over.

In step 602, the functional alias management entity may determine, in the following manners, that the user has the alias takeover right, but this is not limited.

In a first possible implementation, an attribute of the user is whether the user has the alias takeover right, and an association relationship exists between the attribute and the identity of the user. After receiving the takeover request message, the functional alias management entity may know, based on the identity of the user carried in the takeover request message, whether the user has the alias takeover right.

In a second possible implementation, before step 602, the method further includes: the functional alias management entity may perform authorization check on the user.

Specifically, before step 602, the method may further include: the functional alias management entity obtains alias right related information based on the identity of the user, and determines, based on the alias right related information, whether the user has the alias takeover right. The alias right related information may be subscription information of the user, or may be policy information locally stored by the functional alias management entity.

In a possible specific implementation, the functional alias management entity obtains the subscription information of the user based on the identity of the user, where the subscription information of the user includes indication information, and the indication information is used to indicate whether the user has the alias takeover right. The functional alias management entity may determine, based on the subscription information of the user, whether the user has the alias takeover right. When the indication information included in the subscription information is used to indicate that the user has the alias takeover right, the functional alias management entity may determine that the user has the alias takeover right; or when the indication information included in the subscription information is used to indicate that the user does not have the alias takeover right, the functional alias management entity may determine that the user does not have the alias takeover right.

In another possible specific implementation, the functional alias management entity obtains the policy information, and determines, based on the policy information and the identity of the user, whether the user has the alias takeover right, where the policy information includes an identity of a user that has the alias takeover right. When the identity of the user is included in the policy information, the functional alias management entity determines that the user has the alias takeover right; or when the identity of the user is not included in the policy information, the functional alias management entity determines that the user does not have the alias takeover right.

In a third possible implementation, before step 602, the method further includes: the functional alias management entity performs authorization check on the user, and determines whether the alias requested to be taken over is an alias allowed to be taken over.

Specifically, before step 602, the method may further include: when a quantity of identities of aliases requested to be taken over is 1, the functional alias management entity performs authorization check on the user, and determines whether the alias requested to be taken over is an alias allowed to be taken over, and if authorization check on the user succeeds, and the alias requested to be taken over is an alias allowed to be taken over, performs step 602; or when a quantity of identities of aliases requested to be registered is greater than 1, the functional alias management entity performs authorization check on the user, determines whether at least one alias allowed to be taken over exists in the aliases requested to be taken over, and if authorization check on the user succeeds and at least one alias allowed to be taken over exists in the aliases requested to be taken over, performs step 602.

It should be noted that, an execution sequence between authorization check and determining whether the alias requested to be taken over is an alias allowed to be taken over is random and not specifically limited herein. In addition, a specific implementation of performing authorization check on the user in the third implementation is similar to that in the second implementation, and is not described again herein.

Further, when the takeover request message further includes the service type of the alias requested to be taken over, the functional alias management entity may further determine whether the service type of the alias requested to be taken over is the same as the service type corresponding to the identity of the user.

For example, when the alias requested to be taken over is an alias allowed to be taken over, and the service type of the alias requested to be taken over is the same as the service type corresponding to the identity of the user, step 602 is performed.

It should be noted that, when the takeover request message includes identities of two or more aliases requested to be taken over, after authorization check succeeds, the foregoing determining operation may be performed on an identity of each alias requested to be taken over, and step 602 is performed when the foregoing determining operation is performed on the identity of each alias requested to be taken over and at least one alias requested to be taken over is an alias that is successfully taken over. In addition, if no alias that is successfully taken over exists in the aliases requested to be taken over, a failure response message may be returned to the first client.

For example, an attribute of the alias requested to be taken over may include indication information used to indicate whether the alias requested to be taken over is an alias allowed to be taken over.

In the alias management method provided by this embodiment of this application, the functional alias management entity receives the takeover request message sent by the first client and including the identity of the user and the identity of the alias requested to be taken over; and when the user has the alias takeover right, the functional alias management entity sends, to the first client, the takeover response message including the identity of the user and the identity of the alias that is successfully taken over. After the functional alias management entity receives the takeover request message sent by the first client, when determining that the requester that requests to take over the alias has the alias takeover right, the functional alias management entity returns, to the first client, the takeover response message including the identity of the requester and the identity of the alias that is successfully taken over, without correspondingly processing a user configuration file in which the alias is configured. Therefore, alias takeover can be implemented, and a problem of low alias management efficiency and heavy system processing load is resolved.

Optionally, in an implementation scenario of the foregoing embodiment, after step 602, the method further includes: the functional alias management entity deletes an association relationship between the identity of the alias that is successfully taken over and an identity of a user using a second client.

The user using the second client may be a user successfully activating the alias that is successfully taken over.

Specifically, when the functional alias management entity determines that the user has the alias takeover right, if the alias that is successfully taken over is activated by another user (a client used by the another user is the second client), the functional alias management entity may delete an association relationship between the identity of the alias that is successfully taken over and the identity of the user. For example, the functional alias management entity may delete the identity of the another user activating the alias, from activating user information corresponding to the alias that is successfully taken over. In addition, the association relationship between the identity of the user and the alias that is successfully taken over may be stored. In addition, when the alias requested to be taken over is not activated, the alias management method shown in FIG. 5 may be performed to activate the alias.

For example, when the functional alias management entity determines that the user has the alias takeover right, when the alias that is successfully taken over is activated by another user, the functional alias management entity may delete the identity of the user activating the alias, from the activating user information. The user may be a user that activates the alias earliest or latest based on time ordering, or a user that activates the alias and has a lowest user priority based on priorities of users. To be specific, the identity of the user is deleted from the activating user information. Specifically, an algorithm is used to specify the priority of the user. This is not limited in the present invention.

Optionally, in another implementation scenario of the foregoing embodiment, after step 602, the method may further include: the functional alias management entity sends a notification message to the second client.

The notification message is used to notify the second client that the user using the first client successfully takes over the alias that is successfully taken over or used to instruct the second client to deactivate the alias that is successfully taken over. For example, after receiving the notification message, the second client may deactivate the alias that is successfully taken over.

The second client may be a client used by the user that already activates the alias. The user that already activates the alias may be a user that currently still keeps a state of activating the alias, and is not a user that previously activated the alias and subsequently deactivated the alias.

Specifically, the functional alias management entity sends, to the second client, the notification message used to notify that the user successfully takes over the alias that is successfully taken over, or the notification message used to instruct the second client to deactivate the alias that is successfully taken over, so that the second client can deactivate the alias by performing the alias management method shown in FIG. 6. The notification message may be a cause code or may be a plaintext character string in a specific implementation.

Further, when the functional alias management entity is not configured in a mission critical service server, the functional alias management entity may send a takeover notification message to the mission critical service server.

The takeover notification message may include the identity of the user and the identity of the alias that is successfully taken over. An association relationship exists between the identity of the alias that is successfully taken over and the identity of the user. The identity of the user corresponding to the identity of the alias that is successfully taken over may be an identity of one or more users.

When the functional alias management entity is not configured in the mission critical service server, the functional alias management entity may further send a deactivation notification message to the mission critical service server. The deactivation notification message includes the identity of the user and an identity of an alias that is successfully deactivated.

For example, after receiving the takeover notification message and/or the deactivation notification message, the mission critical service server may perform corresponding call control and media control.

When the functional alias management entity is not configured in a functional alias management server, the functional alias management entity may send a takeover notification message and a deactivation notification message to the functional alias management server, so that the alias management server maintains and updates corresponding alias information, where the takeover notification message and the deactivation notification message are respectively similar to the takeover notification message and the deactivation notification message sent by the functional alias management entity to the mission critical service server when the functional alias management entity is not configured in the mission critical service server. Details are not described again herein.

It should be noted that, specific content to be sent in the two notification messages may be implemented by using one message. For example, the functional alias management entity sends a notification message to the mission critical service server, where the notification message includes the identity of the alias that is successfully taken over and the identity of the user, and further includes the identity of the alias that is successfully deactivated and the identity of the user. Certainly, indication information may be used to indicate which aliases are taken over and which aliases are deactivated.

Generally, the alias allowed to be taken over is not allowed to be simultaneously activated by a plurality of users. However, if the alias allowed to be taken over is an alias allowed to be simultaneously activated by a plurality of users, and at a current moment, another user successfully activates the alias allowed to be taken over, whether to take over aliases of all other users or take over an alias of a user, and how to select an alias of a user to take over may be implemented, or an operator itself may specify a rule.

In an alternative solution of the foregoing embodiment, the following step may be used to replace step 602:

When the user does not have the alias takeover right, the functional alias management entity returns a failure response message to the first client. Alternatively, when the user has the alias takeover right, and the alias requested to be taken over is an alias not allowed to be taken over, the functional alias management entity returns a failure response message to the first client.

Further, the failure response message may include a failure cause. For example, when the user does not have the alias takeover right, the failure cause is that authorization check fails. When the first client receives the failure response message carrying the failure cause that authorization check fails, the first client may request a higher right, so as to take over the alias. For another example, when the user has the alias takeover right, and the alias requested to be taken over is an alias not allowed to be taken over, the failure cause is that the alias requested to be taken over is an alias not allowed to be taken over.

It should be noted that, for detailed descriptions in this embodiment of this application, reference may be made to detailed descriptions of corresponding content in the embodiment shown in FIG. 4, and a difference lies only in that "register" is replaced with "take over". Details are not described again in this embodiment of this application.

It should be noted that, the activation notification message, the deactivation notification message, and the takeover notification message in the embodiments of this application may be distinguished by using different types of notification messages. Alternatively, a same type of notification message may be used, but in this case, a piece of indication information needs to be carried in the notification message, where the indication information is used to indicate the type of the message. For example, three bits may be used to indicate the type of the notification message. For example, "001" indicates the activation notification message, "010" indicates the deactivation notification message, and "011" indicates the takeover notification message. For example, if a notification message includes an identity of a user 1 and an identity of an alias 1, and indication information is 001, it indicates that the notification message is used to notify that the user 1 successfully activates the alias 1.

Figure 8:
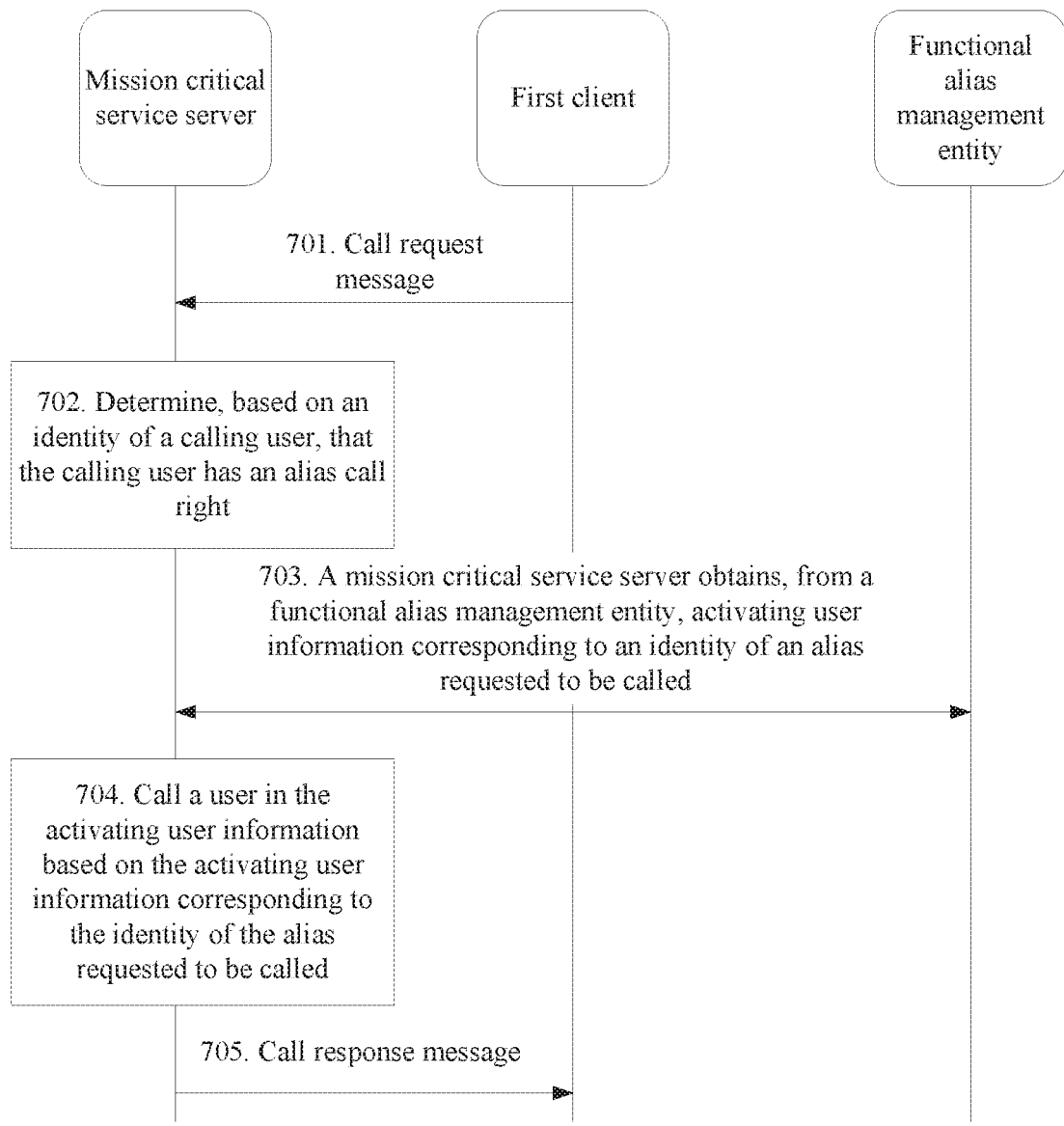
FIG. 8 is a flowchart of an alias-based addressing call method according to an embodiment of this application.

FIG. 8 is a flowchart of an alias-based addressing call method according to an embodiment of this application. As shown in FIG. 8, the method may include the following steps.

701. A mission critical service server receives a call request message sent by a first client.

The call request message includes an identity of a calling user and an identity of an alias requested to be called.

The identity of the calling user may be an identity of a user corresponding to the first client originating a call.

The alias requested to be called may be an alias of a called party, the alias requested to be called may be activated by one or more users, and all users activating the alias requested to be called are invited to join a call. The identity of the alias requested to be called is a name or an identity that can uniquely identify the alias.

In this embodiment of this application, to implement alias addressing and calling functions, the identity of the alias should include a domain name, similar to a group identity.

702. The mission critical service server determines, based on an identity of a calling user, that the calling user has an alias call right.

The mission critical service server may determine, in the following implementations, that the calling user has the alias call right:

Manner 1: The mission critical service server obtains subscription information of the calling user based on the identity of the calling user, where the subscription information of the calling user includes indication information, and the indication information is used to indicate whether the user has the alias call right. The mission critical service server determines, based on the subscription information of the calling user, that the calling user has the alias call right.

For example, when the indication information included in the subscription information is used to indicate that the calling user has the alias call right, the mission critical service server may determine that the calling user has the alias call right; or when the indication information included in the subscription information is used to indicate that the calling user does not have the alias call right, the mission critical service server may determine that the calling user does not have the alias call right.

Manner 2: The mission critical service server obtains policy information, where the policy information includes an identity of a user that has an alias call right. The mission critical service server determines, based on the policy information and the identity of the calling user, whether the calling user has the alias call right.

For example, when the identity of the calling user is included in the policy information, the mission critical service server determines that the calling user has the alias call right; or when the identity of the calling user is not included in the policy information, the mission critical service server determines that the user does not have the alias call right.

Authorization check may be further performed on the user with reference to manner 1 and manner 2.

703. The mission critical service server obtains, from a functional alias management entity, activating user information corresponding to an identity of an alias requested to be called.

The activating user information includes an identity of a user that activates the alias requested to be called. The mission critical service server may send, to the functional alias management entity, a request message including the identity of the alias requested to be called, so that the functional alias management entity returns, to the mission critical service server, the activating user information corresponding to the identity of the alias requested to be called. For example, as shown in Table 2 in another embodiment of this application, when the identity of the alias is xxx, the returned activating user information is: a user service ID 1, a user service ID 2, and a user service ID 3.

704. The mission critical service server calls a user in the activating user information based on the activating user information corresponding to the identity of the alias requested to be called.

According to the example in step 703, the mission critical service server may call clients used by users whose user identities are the user service ID 1, the user service ID 2, and the user service ID 3.

For example, when the calling user and a called user are served by different mission critical service servers, for each called user in the activating user information, assuming that the calling user is served by a mission critical service server 1, and that the called user is served by a mission critical service server 2, the mission critical service server 1 sends a call request message to the mission critical service server 2, where the call request message may include the identity of the calling user, an identity of the called user, and the identity of the alias; then the mission critical service server 2 sends the call request message to a client used by the called user, where the identity of the alias in the call request message is optional, and is used to indicate that the call is a call made by using the alias. If the called user receives the call, the client used by the called user may send a call response message to the mission critical service server 1 by using the mission critical service server 2, to indicate that the call is accepted. Certainly, when the calling user and the called user are served by a same mission critical service server, assuming that both the calling user and the called user are served by the mission critical service server 1, the mission critical service server 1 may directly send the call request message to the client used by the called user.

705. The mission critical service server sends a call response message to the first client.

The call response message may include the identity of the calling user, an identity of an alias that is successfully called, and an identity of a user that is successfully called and corresponds to the identity of the alias that is successfully called.

In the alias-based addressing call method provided by this embodiment of this application, the mission critical service server receives the call request message sent by the first client, where the call request message includes the identity of the calling user and the identity of the alias requested to be called; and when the calling user has the alias call right, the mission critical service server calls, based on the activating user information corresponding to the alias requested to be called, the user that activates the alias requested to be called. After receiving the call request message sent by the first client and including the identity of the calling user and the identity of the alias requested to be called, the mission critical service server determines that the calling user has the alias call right, and then the mission critical service server calls the user corresponding to the alias requested to be called and activating the alias, thereby implementing an alias-based addressing call.

It should be noted that, when a user needs to make an alias-based addressing call, the method shown in FIG. 8 may be performed. The method may be performed on a basis of activating the alias in the method shown in FIG. 5.

The solutions provided by the embodiments of this application are described above from a perspective of interaction between network elements. It may be understood that, each network element, for example, the functional alias management entity or the client, includes a corresponding hardware structure and/or software module for performing each function to implement the foregoing functions. A person skilled in the art should be easily aware that, algorithm steps in the examples described with reference to the embodiments disclosed in this application may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the functional alias management entity may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in the embodiments of this application is merely an example, and is merely division of logical functions. Other division manners may be used in actual implementations.

Figure 9:
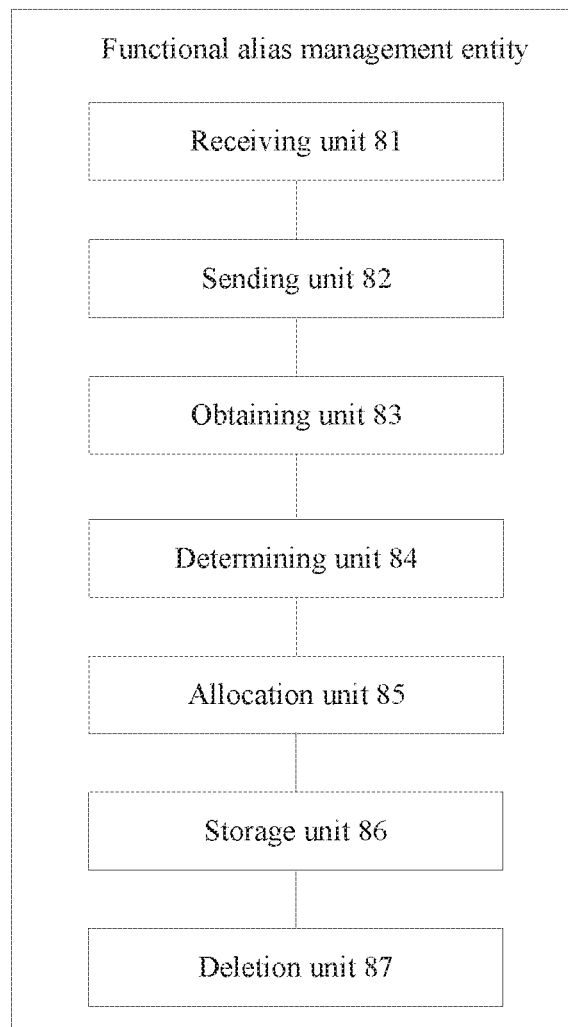
FIG. 9 is a schematic composition diagram of another functional alias management entity according to an embodiment of this application.

When each functional module corresponding to each function is obtained through division. FIG. 9 is a possible schematic composition diagram of the functional alias management entity used in the foregoing embodiments. As shown in FIG. 9, the functional alias management entity may include a receiving unit 81 and a sending unit 82.

The receiving unit 81 is configured to support the functional alias management entity in performing step 301 in the alias management method shown in FIG. 4, step 401 in the alias management method shown in FIG. 5, step 501 in the alias management method shown in FIG. 6, and step 601 in the alias management method shown in FIG. 7.

The sending unit 82 is configured to support the functional alias management entity in performing step 302 in the alias management method shown in FIG. 4, step 402 in the alias management method shown in FIG. 5, step 502 in the alias management method shown in FIG. 6, and step 602 and/or other sending operations in the alias management method shown in FIG. 7.

In this embodiment of this application, the functional alias management entity may further include an obtaining unit 83 and a determining unit 84.

The obtaining unit 83 is configured to support the functional alias management entity in performing the obtaining operations in the alias management methods shown in FIG. 4 to FIG. 7. The determining unit 84 is configured to support the functional alias management entity in performing the determining operations and/or judging operations in the alias management methods shown in FIG. 4 to FIG. 7.

In this embodiment of this application, the functional alias management entity may further include an allocation unit 85 or a storage unit 86 or a deletion unit 87.

The allocation unit 85 is configured to support the functional alias management entity in performing the allocation operation in the alias management method shown in FIG. 4.

The storage unit 86 is configured to support the functional alias management entity in performing the storage operation in the alias management method shown in FIG. 5.

The deletion unit 87 is configured to support the functional alias management entity in performing the deletion operations in the alias management methods shown in FIG. 6 and FIG. 7.

It should be noted that, all related content of each step used in the foregoing method embodiments may be cited in function descriptions of corresponding functional modules. Details are not described again herein.

The functional alias management entity provided by this embodiment of this application is configured to perform the foregoing alias management methods, thereby achieving a same effect as the foregoing alias management methods.

Figure 10:
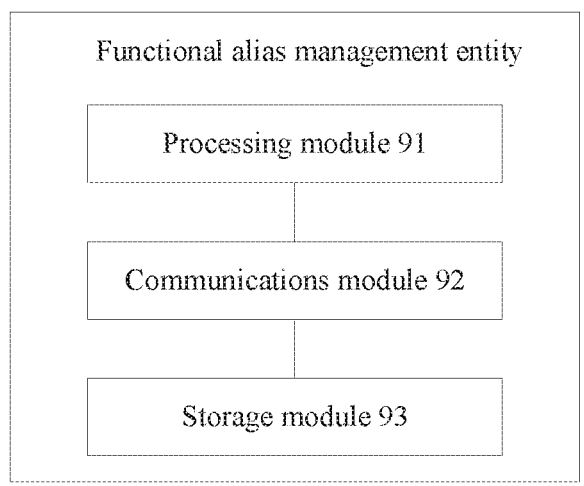
FIG. 10 is a schematic composition diagram of another functional alias management entity according to an embodiment of this application.

When an integrated unit is used, FIG. 10 is another possible schematic composition diagram of the functional alias management entity used in the foregoing embodiments. As shown in FIG. 10, the functional alias management entity may include a processing module 91 and a communications module 92.

The processing module 91 is configured to control and manage actions of the functional alias management entity and/or other processes in the technology described in the specification. For example, the processing module 91 is configured to support the functional alias management entity in performing the obtaining operations in the alias management methods shown in FIG. 4 to FIG. 7, the determining operations and/or the judging operations in the alias management methods shown in FIG. 4 to FIG. 7, and the allocation operation in the alias management method shown in FIG. 4. The communications module 92 is configured to support communication between the functional alias management entity and another network entity, for example, communication with a functional entity or a network entity shown in FIG. 1 and FIG. 2. Specifically, for example, the communications module 92 is configured to support the functional alias management entity in performing step 301 and step 302 in the alias management method shown in FIG. 4, step 401 and step 402 in the alias management method shown in FIG. 5, step 501 and step 502 in the alias management method shown in FIG. 6, and step 601 and step 602 in the alias management method shown in FIG. 7. A functional alias management entity may further include a storage module 93, configured to store program code and data of the functional alias management entity, and is further configured to support the functional alias management entity in performing a storage operation.

The processing module 91 may be a processor or a controller. The processing module may implement or execute various example logical blocks, modules, and circuits described with reference to content disclosed in this application. The processor may also be a combination for implementing a computing function, for example, a combination including one or more microprocessors, or a combination of a DSP and a microprocessor. The communications module 92 may be a transceiver, a transceiver circuit, or a communications interface. The storage module 93 may be a memory.

When the processing module 91 is a processor, the communications module 92 is a communications interface, and the storage module 93 is a memory, the functional alias management entity used in this embodiment of this application may be the functional alias management entity shown in FIG. 3.

In addition, an embodiment of this application further provides a chip system, where the chip system may include a processor, configured to support the functional alias management entity in implementing the functions in any one of the methods in FIG. 4 to FIG. 8. Further optionally, the chip system may further include a memory, where the memory is configured to store a program instruction and data required by the functional alias management entity.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An alias management method, comprising:
receiving, by a functional alias management entity, an activation request message from a first client, wherein the activation request message comprises an identity of a user using the first client and an identity of an alias requested to be activated, wherein the identity of the user is different than the identity of the alias;
obtaining, by the functional alias management entity, subscription information of the user based on the identity of the user, wherein the subscription information comprises indication information, and the indication information indicates that the user has an alias activation right; and in response to the functional alias management entity determining that the indication information indicates that the user has the alias activation right, sending, by the functional alias management entity, an activation response message to the first client, wherein the activation response message comprises the identity of the user and an identity of an alias that is successfully activated, wherein when the alias requested to be activated is an alias that a plurality of users are allowed to simultaneously activate, and a quantity of users who successfully activate the alias requested to be activated is greater than 0 and less than a maximum activation quantity, the alias that is successfully activated is the alias requested to be activated.

2. The method according to claim 1, wherein the first client is integrated in a mission critical service client, and the functional alias management entity is integrated in a mission critical service server.

3. The method according to claim 1, wherein the method further comprises:

storing, by the functional alias management entity, an association relationship between the identity of the user and the alias that is successfully activated.

4. The method according to claim 1, wherein the method further comprises:

sending, by the functional alias management entity, a notification message to a second client, wherein the notification message notifies the second client that the user successfully activates the alias that is successfully activated.

5. A functional alias management entity, comprising at least one processor coupled with a non-transitory storage medium storing executable instructions; wherein the executable instructions, when executed by the at least one processor, cause the at least one processor to:

receive an activation request message from a first client, wherein the activation request message comprises an identity of a user using the first client and an identity of an alias requested to be activated, wherein the identity of the user is different than the identity of the alias;

obtain subscription information of the user based on the identity of the user, wherein the subscription information comprises indication information, and the indication information indicates that the user has an alias activation right; and in response to the functional alias management entity determining that the indication information indicates that the user has the alias activation right, send an activation response message to the first client, wherein the activation response message comprises the identity of the user and an identity of an alias that is successfully activated, wherein when the alias requested to be activated is an alias that a plurality of users are allowed to simultaneously activate, and a quantity of users who successfully activate the alias requested to be activated is greater than 0 and less than a maximum activation quantity, the alias that is successfully activated is the alias requested to be activated.

6. The functional alias management entity according to claim 5, wherein the first client is integrated in a mission critical service client, and the functional alias management entity is integrated in a mission critical service server.

7. The functional alias management entity according to claim 5, wherein the executable instructions, when executed by the processor, cause the processor to:

store an association relationship between the identity of the user and the alias that is successfully activated.

8. A non-transitory computer readable storage medium, configured to store a computer program, wherein the computer program comprises instructions which, when executed, cause a computer to perform the following steps:

receiving an activation request message from a first client, wherein the activation request message comprises an identity of a user using the first client and an identity of an alias requested to be activated, wherein the identity of the user is different than the identity of the alias;

obtaining, by the computer, subscription information of the user based on the identity of the user, wherein the subscription information comprises indication information, and the indication information indicates that the user has an alias activation right; and in response to the computer determining that the indication information indicates that the user has the alias activation right, sending an activation response message to the first client, wherein the activation response message comprises the identity of the user and an identity of an alias that is successfully activated, wherein when the alias requested to be activated is an alias that a plurality of users are allowed to simultaneously activate, and a quantity of users who successfully activate the alias requested to be activated is greater than 0 and less than a maximum activation quantity, the alias that is successfully activated is the alias requested to be activated.

9. The non-transitory computer readable storage medium according to claim 8, wherein the first client is integrated in a mission critical service client.

10. The non-transitory computer readable storage medium according to claim 8, wherein the steps further comprise storing an association relationship between the identity of the user and the alias that is successfully activated.

* * * * *